(12) United States Patent
Ledentsov et al.

(10) Patent No.: US 10,205,935 B2
(45) Date of Patent: Feb. 12, 2019

(54) LASER SYSTEM FOR GENERATION OF COLORED THREE-DIMENSIONAL IMAGES

(71) Applicants: Nikolay Ledentsov, Berlin (DE); Vitaly Shchukin, Berlin (DE)

(72) Inventors: Nikolay Ledentsov, Berlin (DE); Vitaly Shchukin, Berlin (DE)

(*) Notice: Subject to any disclaimer, the term of this patent is extended or adjusted under 35 U.S.C. 154(b) by 64 days.

(21) Appl. No.: 15/665,609

(22) Filed: Aug. 1, 2017

(65) Prior Publication Data

US 2017/0332071 A1    Nov. 16, 2017

Related U.S. Application Data

(63) Continuation of application No. 12/931,147, filed on Jan. 26, 2011, now abandoned, and a continuation of
(Continued)

(51) Int. Cl.
| | | |
|---|---|---|
| *G02B 27/22* | (2018.01) | |
| *H04N 13/363* | (2018.01) | |
| *H04N 13/128* | (2018.01) | |
| *H04N 13/322* | (2018.01) | |
| *H04N 13/324* | (2018.01) | |
| *H04N 13/361* | (2018.01) | |
| *H04N 13/398* | (2018.01) | |
| *G03B 21/28* | (2006.01) | |
| *G03B 35/22* | (2006.01) | |
| *G06T 19/00* | (2011.01) | |
(Continued)

(52) U.S. Cl.
CPC ....... *H04N 13/363* (2018.05); *G02B 27/2221* (2013.01); *G03B 21/28* (2013.01); *G03B 35/22* (2013.01); *G06T 19/006* (2013.01); *H04N 13/128* (2018.05); *H04N 13/322* (2018.05); *H04N 13/324* (2018.05); *H04N 13/361* (2018.05); *H04N 13/395* (2018.05); *H04N 13/398* (2018.05); *G03B 17/54* (2013.01); *G03B 21/53* (2013.01); *H04N 2013/0081* (2013.01)

(58) Field of Classification Search
CPC ............ G02B 27/2207; G02B 27/2221; H04N 13/322; H04N 13/324; H04N 13/334; G06T 19/006
USPC .............................. 359/462, 464; 348/51, 60
See application file for complete search history.

(56) References Cited

U.S. PATENT DOCUMENTS 3,493,290 A * 2/1970 Traub ................. G02B 27/2285
345/31
9,936,193 B2 * 4/2018 Ledentsov ............ G06T 19/006

FOREIGN PATENT DOCUMENTS

JP          2002169124 A  *  6/2002

* cited by examiner

*Primary Examiner* — Audrey Y Chang

(57) ABSTRACT

A laser system for generation of three-dimensional (3D) colored images based on laser sources generating light at a plurality of wavelengths including basic color range (red, green and blue) that illuminate a two-dimensional display, at a given color range wherein a plurality of 2D images formed at different depths by image light impinges on a first optical element, with wavelength-sensitive focal length. All images of the given colored range are perceived by the human's eyes as a single 3D image of this color range. 3D images in red, green and blue that are formed at different positions, are fused by a second optical element, with adjustable focal length. As the light is switched between red, green and blue color ranges, the adjustable focal length is adjusted to compensate a change of the focal length of the first element, so the human's eyes see a fully colored 3D image.

12 Claims, 36 Drawing Sheets

Related U.S. Application Data application No. 14/757,573, filed on Dec. 24, 2015, now abandoned, and a continuation of application No. 14/999,451, filed on May 9, 2016, now Pat. No. 9,936,193.

(51) Int. Cl.
*H04N 13/395* (2018.01)
*G03B 21/53* (2006.01)
*H04N 13/00* (2018.01)
*G03B 17/54* (2006.01)

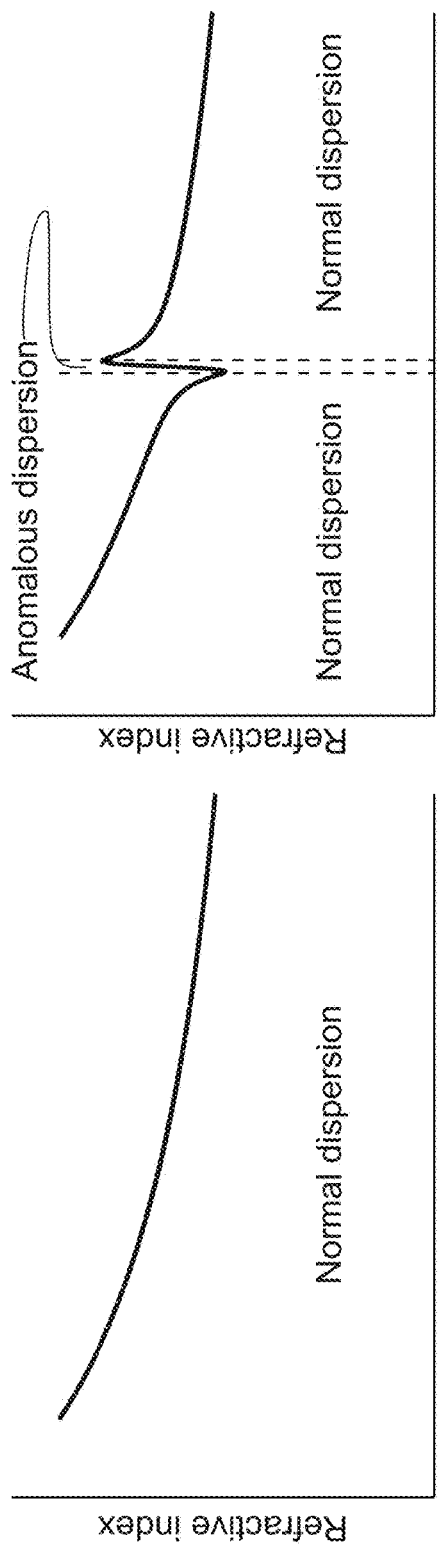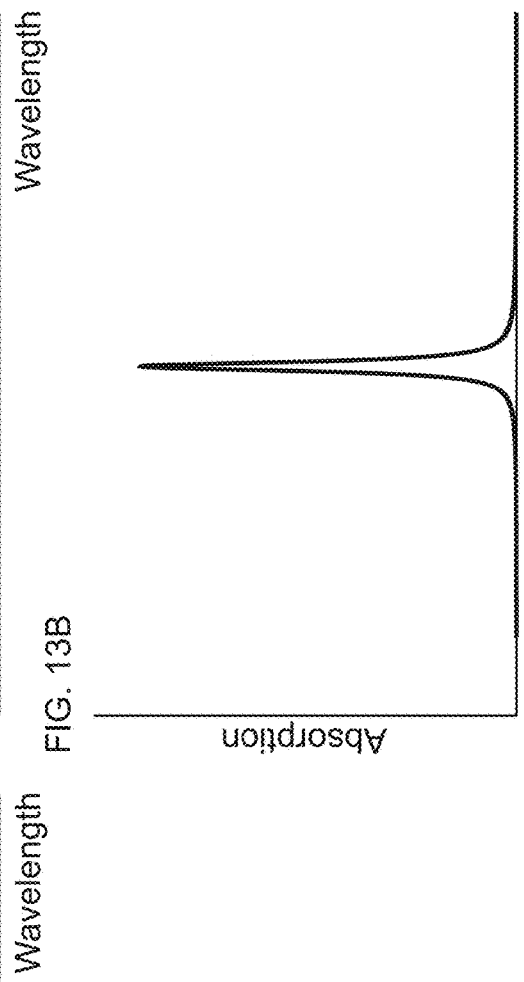

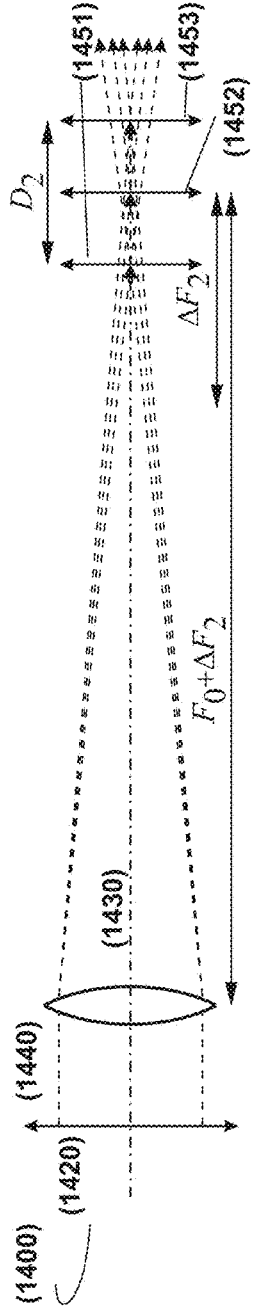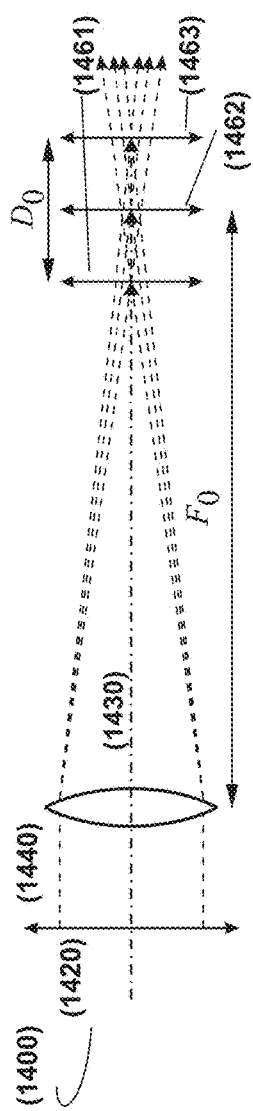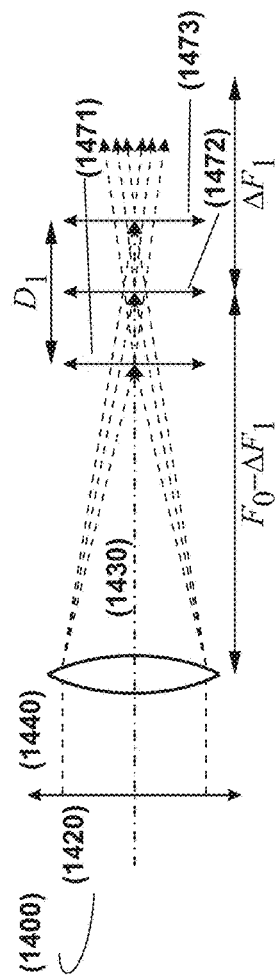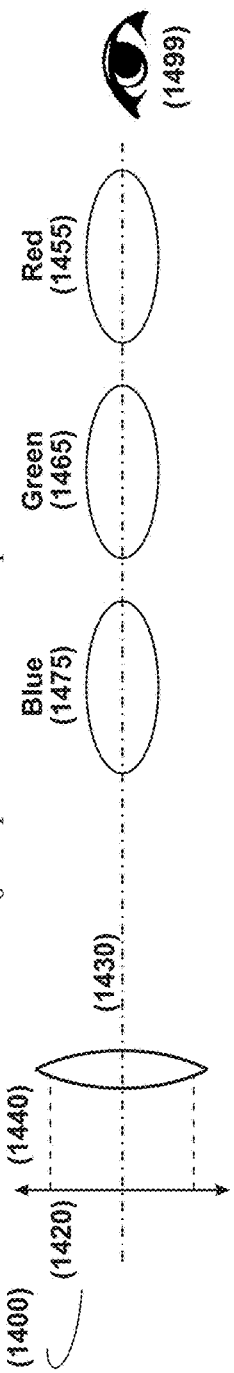
FIG. 14A
FIG. 14B
FIG. 14C
FIG. 14D

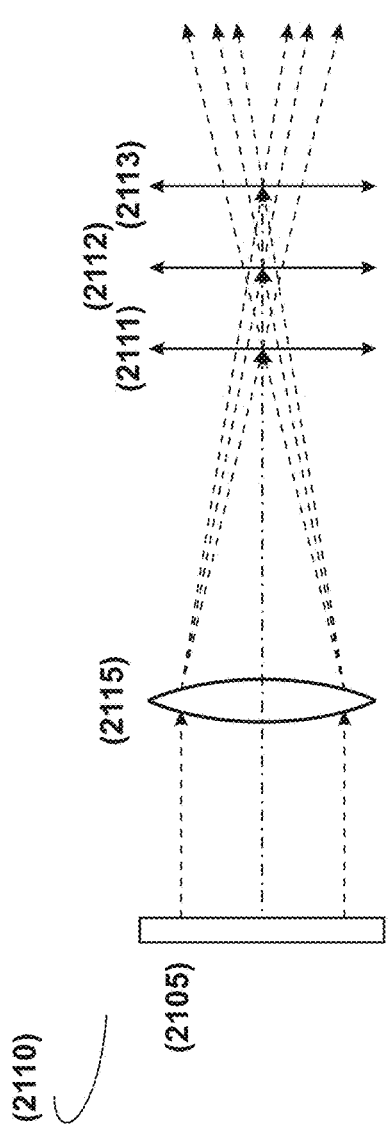
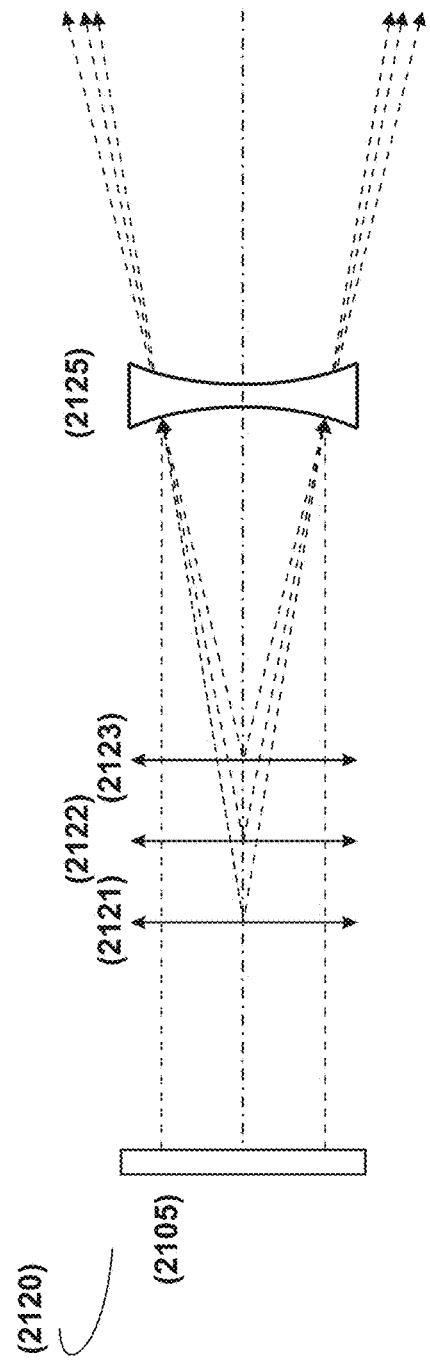
FIG. 21A
FIG. 21B

LASER SYSTEM FOR GENERATION OF COLORED THREE-DIMENSIONAL IMAGES

REFERENCE TO RELATED APPLICATIONS

This is a continuation-in-part of U.S. patent application Ser. No. 12/931,147, filed Jan. 26, 2011, entitled: "Device for Generation of Three-Dimensional Images", of U.S. patent application Ser. No. 14/757,573, filed Dec. 24, 2015, entitled: "Device for Generation of Virtual Three-Dimensional Images" and of U.S. patent application Ser. No. 14/999,451, filed May 9, 2016, entitled: "Device for Generation of Colored Virtual Three-Dimensional Images", all invented by one of the inventors of the present invention, Ledentsov. The aforementioned applications are hereby incorporated herein by reference.

BACKGROUND OF THE INVENTION

Field of the Invention

The present invention relates to systems generating real or virtual three-dimensional (3D) images, preferably moving images, formed from planar two-dimensional (2D) images. More specifically the present invention relates to a device for generation of virtual 3D moving images such as 3D video or motion pictures.

Description of Related Art

There is a need in generation of three-dimensional moving images. Possible applications include 3D cinema, TV displays, out-of-door advertisement boards, computer monitors for training and education, mobile phone projectors, head-up-displays, interactive displays, "touch screen" displays and other. There exist different approaches for generation of 3D images.

Some of the approaches are based on the delivery of two different images generated on a surface of a special screen separately to the observer's left and right eyes thus generating a stereoscopic image. This goal may be achieved by glasses, for example, using blinking glasses synchronized with the display sequentially demonstrating the "left" and the "right" images on the screen. In this case the left and the right eye get the corresponding images separately. In another approach the glasses separate the images for the left and the right eye by using polarized glasses, those providing different linear or circular polarization for the left and the right eyes and the two polarized images created on the polarization-maintaining screen.

It yet another approach it is possible to generate images on a conventional screen using two slightly different wavelengths in the red spectral range, two slightly different wavelengths in the green spectral range and two slightly different wavelengths in the blue spectral range. Then glasses with the corresponding spectrally-sensitive filters are applied such that the left eye receives the first red wavelength, the first green wavelength and the first blue wavelength, and the right eye receives the second wavelength in each spectral range. Thus each eye receives its own full color image based on the related selected wavelengths.

In a further approach a 3D stereoscopic image is realized by using lens gratings attached to the screen and an image composed of the alternating stripes of the "left eye" and "right eye" images with the same spatial periodicity as the periodicity of the lens grating. The lens grating properly attached to the screen deflects the images in a narrow angular space to match the left and the right eye separately. However, the viewing angle range is very narrow in this approach making it so far less suitable for major applications.

In another approach a real image of a 3D object is created by the rotation or motion of a screen or a frame and the synchronized generation of images corresponding to different depth planes of a targeted 3D image. In this approach the signal generation is synchronized with the rotation speed. Thus, the observer's eyes perceive a a 3D image without any need in special glasses. This provides an immense advantage over the glass-related approaches. Special data processing algorithms are developed to generate a 3D image in real time, for example by processing the data derived from stereoscopic or holographic 3D images. For example, left eye and right eye images from conventional glass-assisted 3D images can be processed, coded to a new approach and used to generate 3D images in the moving screen approach. While suited for their intended purpose, a disadvantage of devices of this type is that the display must move at a high rotation speed or at a high translation speed. Furthermore, the most common rotary 3D displays require complex and highly precise mechanics and the related precisely synchronized display imaging schemes.

Virtual 3D images can be generated from real 3D objects. FIG. 1 shows a virtual image of a 3D object as it is perceived by eyes once the virtual image is created by a prior art device. A high quality virtual image hardly distinguishable from the original real object can be generated.

FIG. 2 shows a schematic representation of the prior art for generating virtual images of 3D objects (200). A virtual image (220) of the object (210) is generated and is perceived by the observer's eyes as located in location (220). The virtual image is generated due to an optical system (250) composed of: a real object (210), a lamp (230) and a curved mirror (240). The light from the real object illuminated by a lamp is reflected by a curved mirror (240) through a window (260), and a virtual image (220) is formed. The observer is looking at the window (260) from outside, as depicted in FIG. 1. For large screen application the devices are bulky and virtual images can be applied for the purpose of magnifying the image and redirect the image location.

FIG. 3 shows a device example disclosed in parent patent application Ser. No. 12/931,147, 14/757,573 and 14/999, 451. A device (300) similar to shown in FIG. 2 where the real object (210) is replaced by a two-dimensional (2D) display (310). A 2D display (310) and a curved mirror (240) form an optical system (350). The 2D display is moved, and the virtual image of the display is moved. Once the motion is synchronized with the fraction of the image captured by the 2D display to form a part of the targeted 3D image at a certain depth, the sequence of virtual images observed by the human's eyes at different depths are perceived by the human's eyes as a single 3D image.

Various approaches can be used for 2D display (210). FIG. 8 illustrates schematically a transmissive liquid crystal display as prior art example of a 2D display. A single image element of a thin-film-transistor (TFT) liquid crystal displays is shown (800). The element (800) consists of three sections (851), (852) and (853). Light-emitting diodes (LEDs) (811) generate white light. Three thin film transistors (821), (822) and (823) are placed on top of a plate (820). These transistors are addressed independently. Voltage applied to a base of each transistor controls the optical states of liquid crystal (831), (832) and (833) in the corresponding sections, rendering liquid crystal more or less transparent. Thus, voltage applied to TFT (821) controls the intensity of white light passing through the liquid crystal (831). Voltage applied to TFT (822) controls the intensity of white light passing through the liquid crystal (832). Voltage applied to TFT (823) controls the intensity of white light passing through the liquid crystal (833). On top of the device (800) three colored filters are placed. Red color filter (841) is placed on top of section (851). Green color filter (842) is placed on top of section (852). Blue color filter (843) is placed on top of section (853). Then red light (846), green light (847) and blue light (848) are emitted from the element (800). By an independent control of the intensity of each color cell, the overall intensity and color of mixed light is controlled.

A one skilled in the art will appreciate using liquid crystals also for reflective liquid crystal displays. In the latter case the liquid crystal display is illuminated by white light from the surface, and color cells generate colored image by modulating the intensity of the reflected light.

Another possibility includes using a micro electromechanical system (MEMS). One possible realization of MEMS was disclosed in the patent application "MEMS SHUTTER CONTROL FOR A DISPLAY UTILIZING QUANTUM DOTS", U.S. patent application Ser. No. 13/665,701, filed Oct. 31, 2012, by Gettemy et al., which is hereby incorporated herein by reference. FIG. 9 illustrates a single pixel exploded view of a transmissive display stack up with a MEMS shutter and quantum dot sheet according to prior art of Gettemy. As shown in FIG. 9, backlight (902) can produce a plurality of light beams used by the display stack-up (900) to render a desired image. As illustrated, in this example, three beams of light can be seen emanating from the backlight. Light beam (922) can eventually be used to excite red quantum dot (916). Light beam (924) can eventually be used to excite green quantum dot (918), and light beam (926) can eventually be used to excite blue quantum dot (920). The red, green and blue quantum dots are subpixels that make up pixel (928). A quantum dot could be excited by multiple beams. Furthermore, red, green, or blue light could be generated directly by an LED source, thus obviating the need for one or more of the colored quantum dots. Each light beam (922), (924) and (926) can pass through a MEMS shutter layer (904). MEMS shutter (904) can control the amount of light from each individual light beam that excites each individual quantum dot. Turning to the red quantum dot (916) as an example, when light beam (922) enters MEMS shutter layer (904), MEMS shutter (910) can control how much light from light beam (922) impinges on red quantum dot (916). By controlling the amount of light impinging on red quantum dot (916), one can control the amount of red light produced by the quantum dot. The amount of red light emanating from quantum dot (916) is a function of the amount of energy imparted on the quantum dot. The amount of energy imparted on the quantum dot is a function of the duty cycle of the MEMS shutter (910) in allowing light to pass v. blocking the light. In order to render a desired color out of pixel (928), the amount of red light, green light and blue light emanating out of quantum dots (916), (918) and (920) respectively can be controlled by MEMS shutters (910), (912) and (914). For instance, to generate a pure purple color, MEMS shutter (910), associated with red quantum dot (916) and MEM shutter (914) associated with blue quantum dot (920) can allow equal amounts of light to excite the quantum dot, thus generating light that has equal parts red and blue. MEMS shutter (912) associated with green quantum dot (918) can block any light from impinging on the green quantum dot during the frame. The light can mix above the quantum dots, and because the mixed light consists of equal parts red and blue with no green, a pure purple color will appear at pixel (928). From the example above, any desired color can be rendered by controlling the proportions of red, blue and green light emanating from quantum dot sheet (906).

A one skilled in the art will appreciate that MEMS display can be configured by using different sources of red, green and blue light. Quantum wells or quantum wires can be used instead of quantum dots as the active medium for generating light.

MEMS microdisplays can operate in the conventional transmission mode once they form sequentially color images being illuminated by high brightness color beams, for example by a high brightness white lamp directed to the display through a color wheel.

Alternatively, MEMS can be applied for reflective displays.

Yet another possibility includes using a 2D display based on colored light-emitting diodes (LEDs). FIG. 10 shows schematically a top view of an LED panel (1000). Each pixel (as example, one pixel (1010) is considered in detail) contains a red LED (1011), a green LED (1012) and a blue LED (1013). Each of the LEDs of each pixel are addressed separately, and thus, the intensity of red, green and blue light emitting by each pixel can be controlled. This allows to control intensity and effective color of a mixed RGB light from each pixel.

Other technologies for 2D displays are known in the art. Those include, but are not limited to cathode ray tube display, plasma display panel, surface conduction electron emitter display, field emission display, interferometric modulator display, etc. All those can be applied as practical realization of a 2D display (310).

In the embodiment disclosed in parent patent application Ser. No. 12/931,147, 14/757,573 and 14/999,451 the display (310) moves between two or more positions ((311),(312)). To allow perception of an image by human's eyes as a smoothly moving image, the device must generate at least 24 frames per second. Preferably it is required that a device generates at least 60 frames per second. During the time interval for one frame, a 3D image must be generated. Once the display (310) moves between the positions (311) and (312), which may be considered as extreme positions of the display (310), the virtual image of the display is shifted forth and back between the positions (321) and (322). To form an image that will be perceived by human's eyes as a three-dimensional image, it is preferred that 2D virtual images are being created at least at 10 different depths. To form a 3D image of a high quality, it is preferred that 2D virtual images are being generated at least at 60 different depths.

The device (300) operates as follows. Generation of optical signal emitted from a 2D display (310) and the displacement of the 2D display (310) are synchronized in the following way. Let at the time moment $t_j$ during the time interval of a duration $\Delta t_1$ the display (310) is positioned by a mechanical control system at the coordinate z(j). Then the virtual image is being generated at a depth z(image, j). The electrical signals applied at the same time to all pixels of the display (310), e.g. to the pixels shown for possible realizations of the display in FIGS. 8 and 9, are generated such that the display generates an image corresponding to the targeted virtual image at a depth z(image, j). The movement of the display forth and back is performed during the time interval of a duration $\Delta t_2$, which is set shorter than the averaging time of human's eyes. Thus, all virtual images generated during one cycle of forth and back movement of the display (310)

are generated at different depths and create an image that is perceived by human's eyes as a smoothly moving 3D image.

FIGS. 4A through 4C show schematically optical systems of prior art devices. Such device generally includes at least one lens (1) or a mirror (2) positioned with respect to the optical axis (3) and having a focus (F) at position (4), whereas the distance between the focus and the lens or mirror is the focal length. An object (O) is positioned at location (5) with respect to the optical axis and lens(es) or mirror(s). Each of the optical systems of FIGS. 4A, 4B and 4C, creates a virtual image I (6). The optical system can be configured such that the virtual image is reduced (FIGS. 4A and 4B) or enlarged (FIG. 4C) with respect to the real object.

In FIGS. 5A and 5B an optical system (500) is shown, whereas the mirror (540) is deformable and this affects the focal length of the optical system. Upon variations in the focal length, the mirror (540) creates, of the same object "O" (520) virtual images at different locations. Two of possible locations of the virtual image are shown as example (521, 522).

FIG. 11 illustrates the mechanism of the formation of a three-dimensional image. Signal processing unit (1110) generates two types of signals, synchronized with each other. The object "O" of FIGS. 5A and 5B is a two-dimensional display (1120). A first (1151) of the two signals generated by the signal processing unit (1110) is applied to a 2D display (1120) generating a 2D image. A second (1152) signal is applied to the mechanical control system (1115) which applies deformation to the mirror (540). Upon deformation, the mirror (540) takes a different shape. Two shapes (1141) and (1142) are shown in FIG. 11. Depending on variable shape of the mirror (540), the focal length changes, and the virtual image of the 2D display (1120) is formed always at a new position. Two limiting positions, (521) and (522) are shown in FIG. 11. Upon deformation of the mirror (540), the virtual image of the display is formed at a different image depth. The first signal (1151) and the second signal (1152) are synchronized such that once a 2D image is formed on the 2D display, the mirror (540) is deformed such that the virtual image of the 2D display is formed at a depth targeted for this particular 2D image.

To allow perception of an image by human's eyes as a smoothly moving image, the device must generate at least 24 frames per second. Preferably it is required that a device generates at least 60 frames per second. During duty cycle, i.e. during the time interval for one frame, a 3D image must be generated. Once the sequence of 2D images is formed on the 2D display (1120), the position of the virtual image of the 2D display varies from the two extreme positions (521) and (522) forth and back. To form an image that will be perceived by human's eyes as a three-dimensional image, it is preferred that the 2D virtual images are being created at least at 10 different depths. To form a 3D image of a high quality, it is preferred that 2D virtual images are being generated at least at 60 different depths.

Various approaches can be applied to vary in a controllable way the focal length of a lens or a mirror. One possible way includes employing electro-optic effect as discussed in the publications by K. T. Cahagan et al., "FABRICATION AND CHARACTERIZATION OF HIGH-SPEED INTEGRATED ELECTRO-OPTIC AND SCANNER DEVICES", Part of the SPIE Conference on Integrated Optic Devices III, San Jose; California, 1999, SPIE Volume 3620, pp. 374-379, and M. J. Kawas, "DESIGN AND CHARACTERIZATION OF DOMAIN-INVERTED ELECTRO-OPTIC LENS STACK IN LiTaO3", Master of Science Thesis, Department of Electrical and Computer Engineering, Carnegie Mellon University, Pittsburgh, Pa., 1996, URL: https://www.ece.cmu.edu/research/publications/1996/CMU-ECE-1996-005.pdf wherein both these publications are hereby incorporated herein by reference.

In an electro-optical crystal such as Z-cut LiTaO3 the effective index of refraction, in an applied electric field is $$n' = n_e - \frac{1}{2}n_e^3 r_{33} E_3, \tag{1}$$

where $n_e$ is the extraordinary index of refraction, $r_{33}$ is the electro-optic coefficient, $E_3$ is the applied field component along the spontaneous polarization $P_s$ of the ferro-electric domains. The relative orientation of the applied field with respect to the polarization vector determines the sign of the index change.

Typical electro-optic lens (1210) (shown in FIG. 12A) has oppositely oriented ferro-electric domains inside and outside lens structure. Once the electric field is applied antiparallel to the domains inside the lens causing a local refractive index increase. Simultaneously, this electric field is parallel to the domains outside the lens structure causing a local index decrease.

FIG. 12B shows a top view on a stack (1200) of plano-convex lenses (1220) wherein the stack is used to enhance the effect of focusing the light. FIG. 12C shows a prospective view on the same stack (1200) of plano-convex lenses. A one skilled in the art will agree that using of two stacks of plano-convex lenses, rotated by 90 degrees, allows focusing of light in both mutually perpendicular planes.

FIG. 7 illustrates a possible application field for three-dimensional displays, namely, an interactive system (700) disclosed in parent patent application Ser. No. 12/931,147, 14/757,573 and 14/999,451. The interactive system (700) is composed of a projection display generating virtual image (705) that is perceived by the operator's eye (operator=observer) (740) as a three-dimensional image, a real object (710), a camera (720) suitable for taking three-dimensional pictures and an image-processing system (730).

For example, a virtual keyboard can be projected as a virtual image that is perceived by the operator's eyes (740) as a 3D image. The hands of the operator are monitored by a three-dimensional camera (720). In FIG. 7 the real object (710) is the operator's hands. Once the operator's hands (710) touche a spatial position, that is empty, but is the position, at which the observer's eyes observe a virtual image of a certain key of the virtual keyboard, the camera (720) monitors this particular position of the operator's hands (710) and transfers the signal to the image-processing system (720). The image processing system (720) processes the signal in the same way as it would process a signal generated by touching a real key on a real keyboard by the operator's hands. Thus, the image-processing system (720) aligns geometrical characteristics of the virtual image (705) with the geometrical characteristics of the real object (710). Such approach can be useful in airspace or automotive industry, where an observer is able to operate a keyboard without deflecting his eyes from observing the space in front of him.

Another realization of an interactive system contains using a real keyboard and a virtual 3D image of the observer's hands. Yet another application uses a virtual keyboard and a virtual image of the observer's hands. All these applications are based on a system generating 3D virtual images.

FIG. 6 illustrates yet another approach to the formation of 3D images. More precisely, FIG. 6 represents a focus-adjustable mirror with wavelength-sensitive focus. Different ways of focus adjustability can be applied. In one approach focus adjustability is achieved by mechanical motion of the mirror. Another approach uses electro-optic effect-induced change of the refractive index of the material of the mirror, and, hence, of the focal length or the mirror. Yet another approach suggests applying thermal effect-induced change of the refractive index of the material and, thus, of the focal length of the mirror. Alternatively, acousto-optic effect-induced change of the refractive index of the materials, and, thus, of the focal length of the mirror can be used. A further approach can be based on the electric field-induced change of the shape of the mirror and, thus, of its focal length. Yet another approach suggests applying a mirror or a lens reconfigurable due to using micro-electro-mechanic systems (MEMS).

An optical system (600) contains a curved mirror (640) formed of materials, the refractive indices of which has a pronounced frequency dispersion, i. e., the refractive index depends on the wavelength of light. Then the focal length of the mirror (640) is wavelength-sensitive. This allows using a wavelength $\lambda_1$ to form a two-dimensional image which results, by means of the mirror (640) in the formation of a virtual image at a depth $d_1$, and using a slightly different wavelength $\lambda_2$ to form a two-dimensional image which results by means of the mirror (640) in the formation of a virtual image at a different depth $d_2$, due to a different focal length of the mirror (640) for a slightly different wavelength of light. Both wavelengths are from the same basic color range of the visible spectrum, e. g., red. Then, by synchronization of applying different wavelengths from the same basic color range, which results in the formation of virtual images at different depths, a virtual image perceived by the human's eyes as a 3D image is formed. This image, however, is formed in one basic color. FIG. 6 illustrates that 3D images, formed in different basic color ranges, are formed at different positions. Thus, the average 3D image plane in red (671) and the average 3D image plane in blue (672) are shown in FIG. 6. The images in different colors can be merged as the mirror is focus-adjustable.

FIGS. 14A through 14D illustrate this approach to the formation of 3D images in more detail. A similar optical system (1400) contains a lens (1440) having a wavelength-sensitive focal length. FIG. 14A shows a two dimensional display (1420), that generates 2D images at different wavelengths in the red color spectrum. Images generated on a display (1420) at three different wavelengths, form images (1451), (1452) and (1453) at different depths along the optical axis (1430). The plurality of two-dimensional images (1451), (1452), (1453) can be characterized by a position of the "center of gravity", or a mean position of an image (in FIG. 14A this is the position of the image (1452)), located at a distance $F_0+\Delta F_2$ from the lens (1440)) and a maximum depth variation $D_2$ (in FIG. 14A the latter is the distance between the most remote two-dimensional image from the lens, (1453) and the closest one (1451)).

FIG. 14B shows that images generated on a 2D display (1420) at three different wavelengths in the green spectral range form images (1461), (1462) and (1463) at different depths on the optical axis (1430). The plurality of two-dimensional images (1461), (1462), (1463) can be characterized by a position of the "center of gravity", or a mean position of an image (in FIG. 14B this is the position of the image (1462)), located at a distance $F_0$ from the lens (1440)) and a maximum depth variation Do (in FIG. 14B the latter is the distance between the most remote two-dimensional image from the lens, (1463) and the closest one (1461)).

FIG. 14C shows that images generated on a 2D display (1420) at three different wavelengths in the blue spectral range form images (1471), (1472) and (1473) at three different depths on the optical axis (1430). The plurality of two-dimensional images (1471), (1472), (1473) can be characterized by a position of the "center of gravity", or a mean position of an image (in FIG. 14C this is the position of the image (1472)), located at a distance $F_0-\Delta F_1$ from the lens (1440)) and a maximum depth variation $D_1$ (in FIG. 14C the latter is the distance between the most remote two-dimensional image from the lens, (1473) and the closest one (1471)).

FIG. 14D illustrates that, once images formed at different depths and perceived by the human's eyes (1499) as 3D images will be perceived as separate 3D red image (1455), 3D green image (1465) and 3D blue image (1475), all at different locations.

The reason of the fact, that 3D images in red, green and blue color are formed at different locations, is associated with fundamental properties of the frequency dispersion of the refractive index in the materials. A one skilled in the art will agree that the real and imaginary parts of the dielectric function $$\varepsilon(\omega)=\varepsilon_1(\omega)+i\varepsilon_2(\omega) \quad (2)$$

are connected via the Kramers-Kronig relation, $$\varepsilon_1(\omega) = 1 + \frac{2}{\pi} v \cdot p \cdot \int_0^\infty \frac{\omega' \varepsilon_2(\omega')}{\omega'^2 - \omega^2} d\omega'. \quad (3)$$

Here $\omega$ is the frequency of light, $\omega=2\pi c/\lambda$ (where c is the velocity of light in the vacuum), and the integral in Eq. (3) is understood as the Cauchy principal value. The dielectric function is related to the complex refractive index $n(\omega)=n_1(\omega)+in_2(\omega)$ as follows $$\varepsilon(\omega)=\varepsilon_1(\omega)+i\varepsilon_2(\omega)=[n_1(\omega)+in_2(\omega)]^2=[n_1^2(\omega)-n_2^2(\omega)]+i2n_1(\omega)n_2(\omega). \quad (4)$$

The imaginary part of the refractive index is proportional to the absorption coefficient, $$n_2(\omega) = \frac{\alpha(\omega)c}{2\omega}. \quad (5)$$

Then, at the frequency of light lower than any absorption bands, it follows from Eq. (3) that the real part of the dielectric function, and, hence, the real part of the refractive index $n_1(\omega) \approx \sqrt{\varepsilon_1(\omega)}$ decreases once the frequency decreases, i.e., once the wavelength of light increases. This is the normal dispersion revealing a decrease of the refractive index upon increase of the wavelength (FIG. 13A).

FIG. 13B shows a possibility of anomalous dispersion, where, in a certain interval of the wavelengths, the refractive index increases upon wavelength. The anomalous dispersion is associated with the absorption (FIG. 13C) which is strongly undesirable for using of materials as materials for lenses and mirrors.

FIGS. 13A through 13C shows that it would be extremely challenging finding a proper material, which would have a significant dispersion in the transparency ranges of the red, green and blue parts of the visible spectra, and, at the same time would have certain intervals of anomalous dispersion between red and green as well as between green and blue, wherein such anomalous dispersion would return the refractive index in the green region the to same value as in the red region, same for blue.

Thus, it was stated in the patent application Ser. Nos. 12/931,147, 14/757,573 and 14/999,451, in particular, in relation to FIG. 6 of those patent applications, that 3D images formed separately in the red, green and blue colors, must be fused in a single colored 3D image.

Thus, there is a need to disclose a detailed way of configuring such an optical system that generates 3D images in full color.

SUMMARY OF THE INVENTION

The present invention discloses a laser system for generation of three-dimensional (3D) colored images. The system is based on semiconductor laser sources enabling generation of the laser light at a plurality of optical wavelengths. The laser source for each basic color is formed on a single chip, different chips being used for different colors. Such chip can be an array of the distributed feedback lasers, each of which generates laser light at its own wavelength of the given color range, or an array of distributed Bragg reflector lasers, each of which generates laser light at its own wavelength of the given color range, or a COMB laser generating laser light at a plurality of the wavelengths.

The channel of laser light at each single wavelength is controlled independently. The laser light in all channels illuminates a two-dimensional display, and the light transmitted through the display or reflected by the display at a given basic color range impinges on an optical unit, containing a first element, e. g., a lens or a mirror, the focal length of which is wavelength-sensitive. Laser light at different wavelengths forms two-dimensional images at different depths. Then, once the image created by the display and the laser pulses at each wavelength of light are synchronized, all images of the given colored range are being perceived by the human's eyes as a single 3D image of this color range.

3D images formed separately in red, green and blue can be fused, if an optical element (e. g., a lens or a mirror) with a focal length adjustable by means of mechanical motion, or deformation, or applying an electro-optic effect in an external electric field is used. This can be either the same element as the first element with the wavelength-dependent focal length, or a different element. Then, once the light illuminating the display is switched between different basic color ranges (e.g., between red, green and blue), the adjustable focal length of this element is adjusted such to compensate a change of the focal length of the first element, and the focal length of the entire optical unit is restored.

An example duty cycle of the operation contains three time intervals for red, green and blue light, respectively. During the first time interval the red laser sources are switched on, the green and blue are switched off, and the 3D red image is formed. Then the focal length of the optical unit is shifted such to compensate its shift due to a switch between red and green driven by the wavelength dependence of the focal length of the first optical element. During the second time interval, a 3D green image is formed. Then the focal length is again instantly shifted to compensate a switch between green and blue. During the third time interval, a 3D blue image is formed. Then the focal length is shifted back to the initial position, and the duty cycle is repeated. The duration of the duty cycle is selected such that the human's eyes average the perceived light and see a smoothly moving colored 3D image.

BRIEF DESCRIPTION OF THE DRAWINGS

FIG. 5A. Curved mirror is at a first state of deformation, a virtual two-dimensional image is formed at a first position $I_1$.

FIG. 5B. Curved mirror is at a second state of deformation, a virtual two-dimensional image is formed at a second position $I_2$.

FIG. 13A. Schematic view of normal dispersion of the refractive index of an optical material.

FIG. 13B. Example of anomalous dispersion of the reflective index of an optical material.

FIG. 13C. Absorption spectrum of the optical material in the same spectral region, where anomalous dispersion occurs.

FIG. 14A. Formation of a three-dimensional image in the red basic color range by a lens having a wavelength-sensitive focal length.

FIG. 14B. Formation of a three-dimensional image in the green basic color range by a lens having a wavelength-sensitive focal length.

FIG. 14C. Formation of a three-dimensional image in the blue basic color range by a lens having a wavelength-sensitive focal length.

FIG. 14D. Formation of three-dimensional images in red, green and blue color ranges at different spatial positions.

FIG. 21A. Formation of a three-dimensional image by directing the laser light at multiple wavelength onto an optical element having a wavelength-sensitive focal length, wherein the optical element is realized by a converging lens having a wavelength-sensitive focal length, according to yet another embodiment of the present invention.

FIG. 21B. Formation of a three-dimensional image by directing the laser light at multiple wavelength onto an optical element having a wavelength-sensitive focal length, wherein the optical element is realized by a diverging lens having a wavelength-sensitive focal length, according to a further embodiment of the present invention.

DETAILED DESCRIPTION OF THE INVENTION

In order to employ an optical element with a wavelength-sensitive focal length for the formation of a three-dimensional image, one needs a source of light emitting light in a plurality of wavelengths, whereas these wavelengths are distinct from each other and have a stable spectral spacing. A multiple wavelength laser source can potentially serve these needs. Cost-effective solution requires using semiconductor diode lasers. However, diode lasers are usually not wavelength-stabilized, as the lasing wavelength varies upon variation of ambient temperature. To use red light at multiple wavelengths in the red spectral region, same for green and same for blue, one needs a solution that would keep stable spectral separation between different wavelengths.

The present patent application disclose using a multi-wavelength laser source based on a single semiconductor chip. Then, upon variation of temperature, different wavelengths shift together, and the spectral separation between different wavelengths remains stable.

Figure 15:
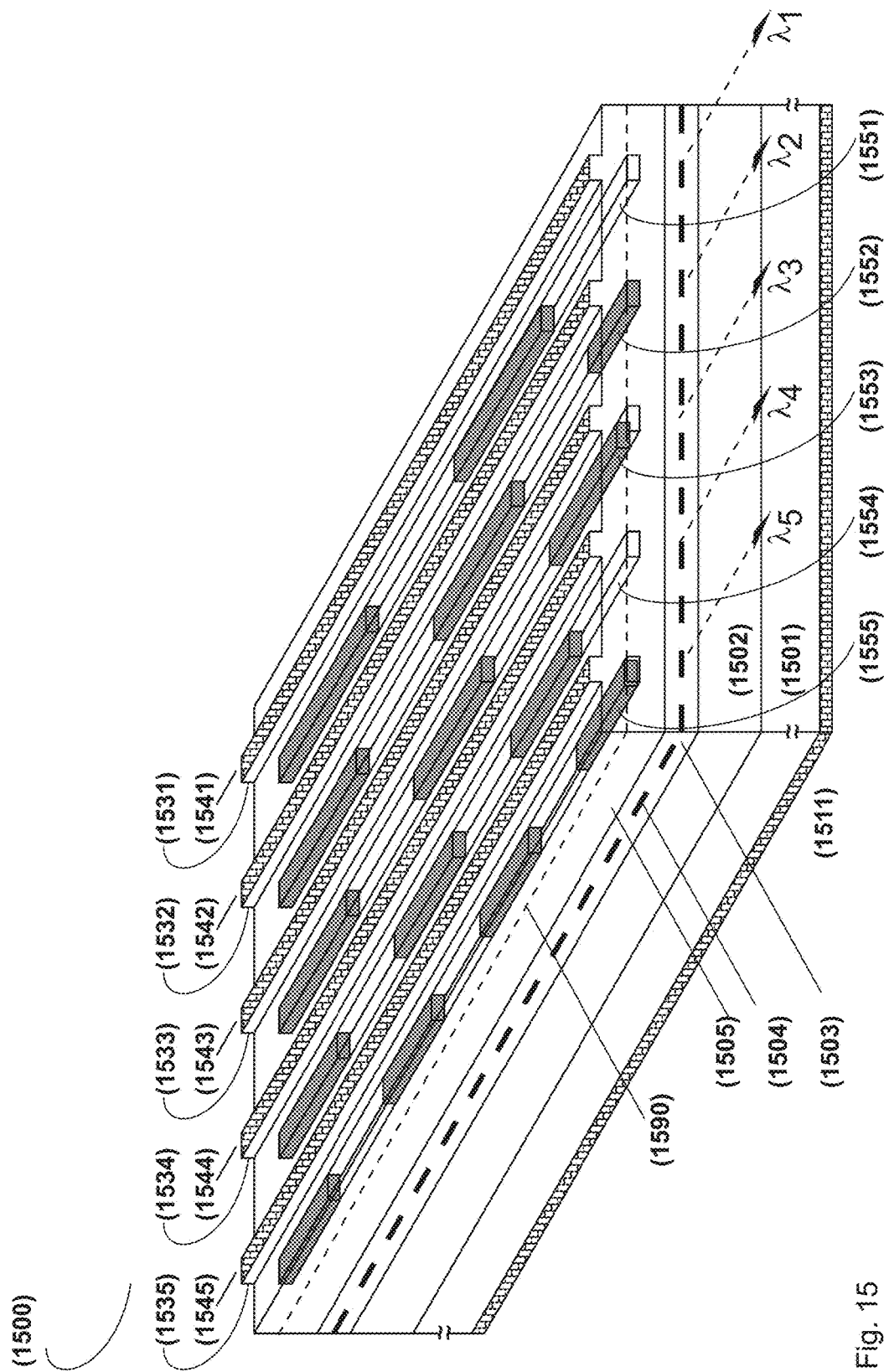
FIG. 15. Schematic prospective view on a multiwavelength laser source on a single semiconductor chip realized by an array of distributed feedback lasers with different periodicities, according an embodiment of the present invention.

FIG. 15 shows schematically an array (1500) of distributed feedback lasers formed on a single semiconductor chip, according to an embodiment of the present invention. The array (1500) is grown epitaxially on a substrate (1501), which is preferably n-doped. The structure contains a bottom cladding layer (1502), preferably n-doped, a waveguide (1503), preferably undoped or weakly doped, into which the active medium (1504) is introduced. On top of the waveguide (1503), a top cladding (1505) is grown, which is preferably p-doped. A set of gratings (1551), (1552), (1553), (1554), (1555) is embedded in the top cladding (1505). Different approaches are possible to form the set of gratings. In the embodiment of FIG. 15 the p-cladding is grown up to the level (1590), then, grooves are etched in the longitudinal direction, and the groves are periodically filled with dielectric material. Then, the structure is overgrown to complete the top cladding (1505). Above each groove, a ridge is formed and a top contact (p-contact) is mounted on top of each ridge. Thus, ridge (1531) with a top contact (1541) is formed above the grating (1551). Similarly, the ridge (1532) with a top contact (1542) is formed above the grating (1552). The ridge (1533) with a top contact (1543) is formed above the grating (1553).

The ridge (1534) with a top contact (1544) is formed above the grating (1554). The ridge (1535) with a top contact (1545) is formed above the grating (1555). The bottom contact (n-contact) (1511) is mounted on a back surface of the substrate (1501). Each of the gratings (1551), (1552), (1553), (1554), (1555) is configured such that it stabilizes its own wavelength.

Figure 16:
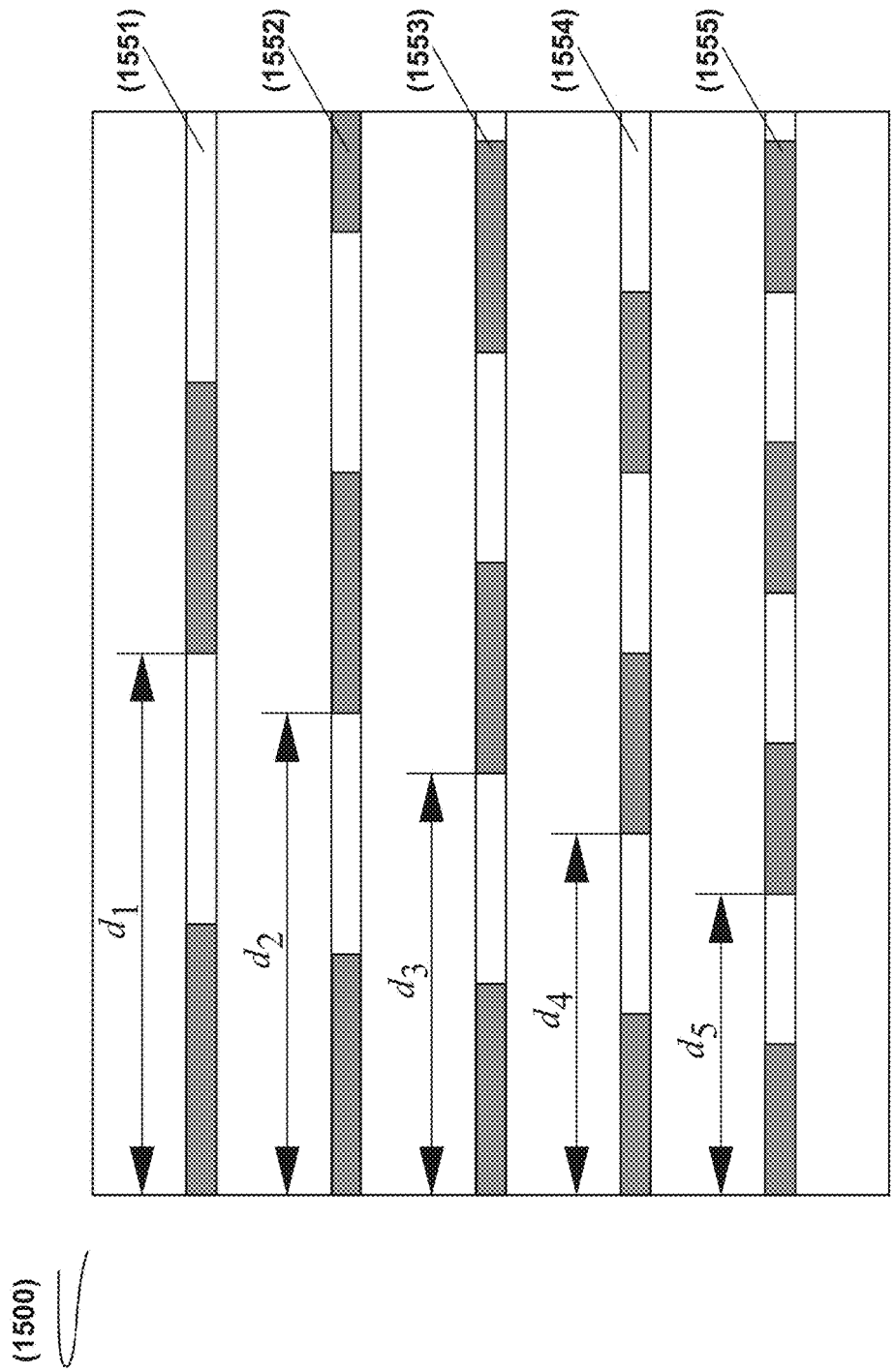
FIG. 16. Cross-section in a horizontal plane of the array of distributed feedback lasers on a single semiconductor chip showing different periodicities of the constituting lasers, according to the embodiment of the present invention of FIG. 15.

FIG. 16 illustrates schematically the cross-section of the device (1500) in the horizontal plane on the level, where the gratings are formed. Each of the gratings (1551), (1552), (1553), (1554), (1555) has its own spatial periodicity $d_1$, $d_2$, $d_3$, $d_4$, $d_5$. The periodicity stabilizes the emitted wavelength of each laser. If the distributed feedback laser of the first order is used, the stabilized wavelength equals $$\lambda = 2dn_{eff}, \quad (6)$$

where $n_{eff}$ is the effective refractive index of the optical mode propagating in the longitudinal direction. Correspondingly, different periodicities in FIG. 16 result in different stabilized wavelengths $\lambda_1$, $\lambda_2$, $\lambda_3$, $\lambda_4$, $\lambda_5$ as marked in FIG. 15.

The distributed feedback lasers of the array (1500) have a common n-contact (1511) and separate p-contacts (1541), (1542), (1543), (1544), (1545). Thus, each of the lasers can be independently driven, independently switched on or off, and the output power can be independently controlled.

The targeted difference in wavelengths between two channels is determined by spectral width of each basic color range and by the number of different wavelengths targeted for each basic color range. Red color corresponds to the spectral range 780-622 nm, green color refers to light at wavelengths 577-492 nm and blue light has wavelengths in the range 492-455 nm (e. g., http://www.livephysics.com/physical-constants/optics-pc/wavelength-colors/). If the targeted number of wavelengths per each basic color range is about 20, then the spectral separation between two neighboring wavelengths is about 2 nm. Then, the difference in periodicities of the two corresponding distributed feedback lasers equals $$\Delta d = d \frac{\Delta \lambda}{\lambda}. \tag{7}$$

Then, for a laser array with the cavity length L, the number of periods equals $$N = \frac{L}{d} = \frac{2n_{eff}L}{\lambda}, \tag{8}$$

and $$\Delta N = N \frac{\Delta \lambda}{\lambda}. \tag{9}$$

For a typical cavity length L=3 mm of the laser array, $n_{eff}$=3.5, $\lambda$=500 nm, the number of periods is N~40000 and the difference in the number of periods between two lasers is $\Delta$N~160.

A one skilled in the art will appreciate that the gain spectrum of the semiconductor chip should be rather broad, i. e., a few tens of nanometers, to promote lasing of multiple individual lasers with different stabilized wavelengths. Such broad gain spectrum can be achieved by using multiple quantum well structure for the active medium, while individual quantum wells have different thickness and/or material composition resulting in a relative shift of the gain spectra from one quantum well to another and, thus, in a broad gain spectrum of the multiple quantum well active region.

Figure 17A:
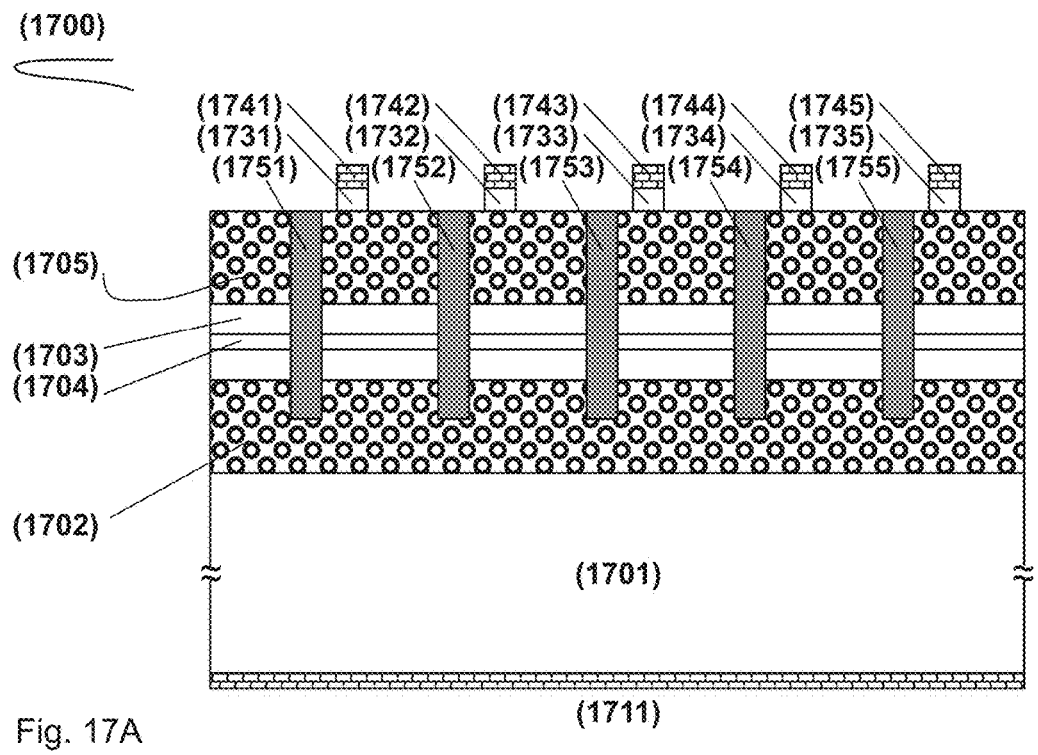
FIG. 17A. Schematic cross-section in a vertical plane perpendicular to the stripes of an array of distributed feedback lasers, formed by deep etching through the quantum dot-based active medium, according to another embodiment of the present invention.
Figure 17B:
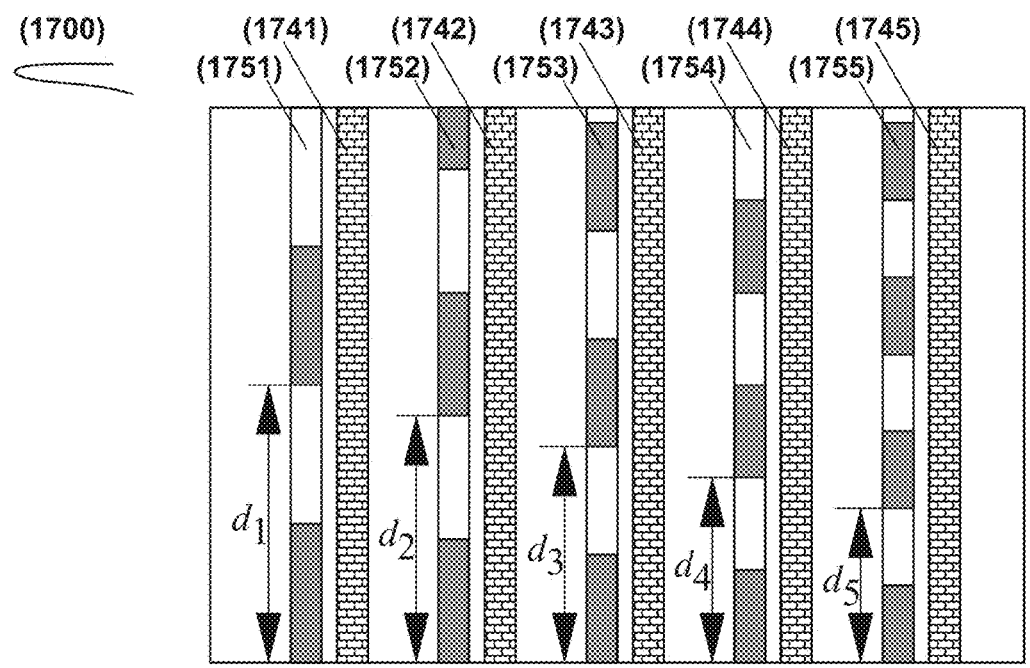
FIG. 17B. Schematic top view of the array of distributed feedback lasers of FIG. 17A.

It is often not desirable to apply overgrowth for the fabrication of a distributed feedback laser or an array of such lasers. FIGS. 17A and 17B show schematically an array (1700) of distributed feedback lasers (vertical cross-section in the plane perpendicular to the stripes, FIG. 17A, and cross-section in a horizontal plane, FIG. 17B), for the fabrication of which no overgrowth is needed, according to another embodiment of the present invention. Once the active region of the lasers is formed of quantum dots, it is possible to etch through the active region without deterioration of the optical properties, as in-plane diffusion of carriers, which in case of quantum wells would deliver the carriers to structural defects, is strongly suppressed for the quantum dot structure. The array (1700) is grown epitaxially on the substrate (1701), which is preferably n-doped. The structure contains the bottom n-doped cladding (1702), the waveguide (1703), into which the quantum dot-based active region (1704) is introduced, and the top p-doped cladding (1705). The bottom, n-contact (1711) is mounted on the back surface of the substrate (1701). The array (1700) of lasers is formed by fabricating of multiple ridges (1731), (1732), (1733), (1734), (1735), on top of which p-contacts (1741), (1742), (1743), (1744), (1745) are correspondingly mounted. Close to each ridge a groove is etched through the active region. The groove (1751) is formed close to the ridge (1731) and filled by a periodic dielectric structure with a periodicity di. Correspondingly, the grooves (1752), (1753), (1754), (1755), are etched close to the ridges (1732), (1733), (1734), (1735) and filled by dielectric gratings with the periodicities $d_2$, $d_3$, $d_4$, $d_5$, respectfully. There are several advantage of using such kind of gratings. First, the gratings are present in the plane of the active region, i. e. in the plane, where the vertical optical field has the maximum intensity. Second, the gratings are positioned in the lateral plane close to the stripes, i. e. close to the areas in the lateral plane, where the optical field in strong. Third, no overgrowth is needed for the fabrication of the array (1700).

Figure 18:
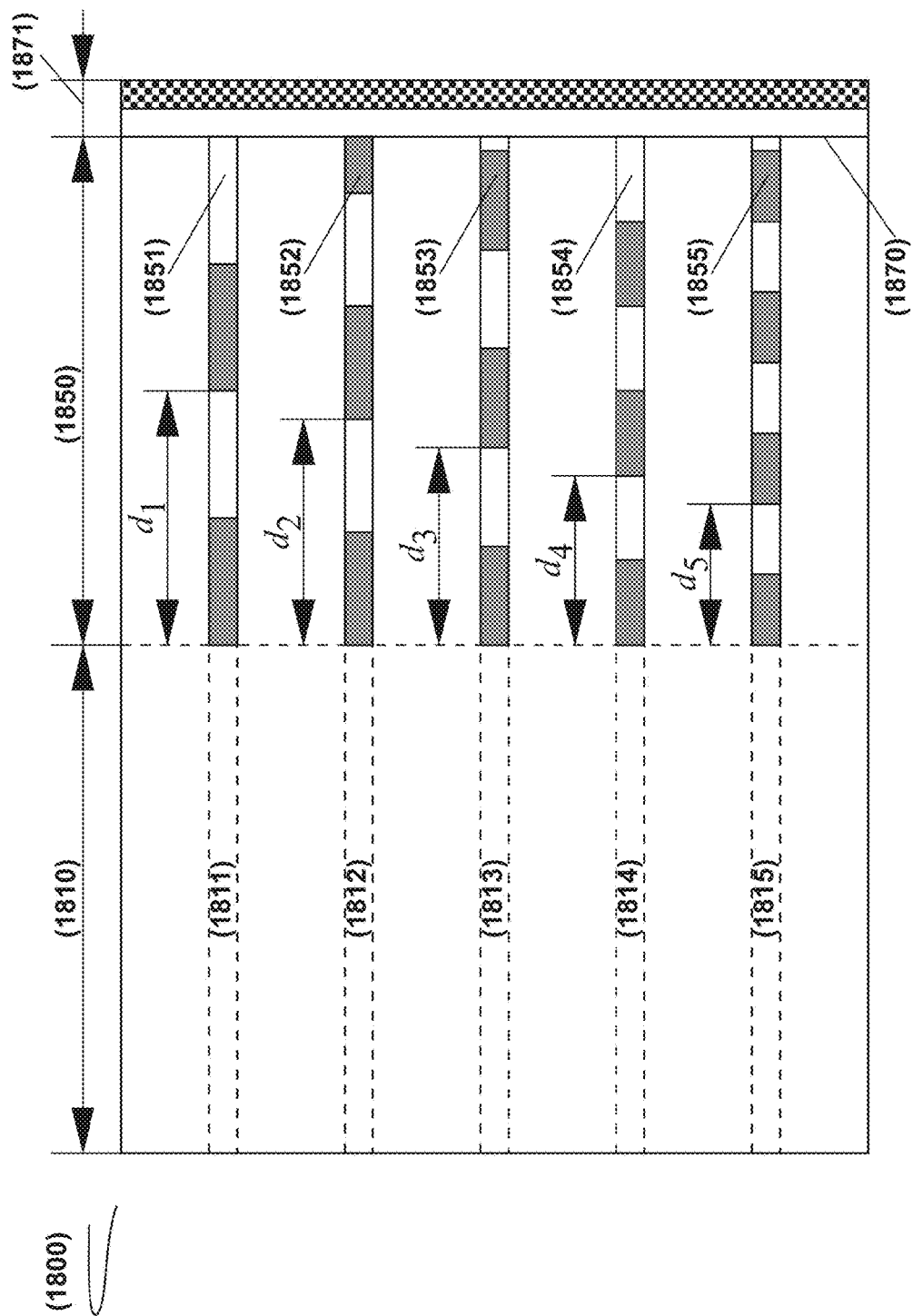
FIG. 18. Schematic cross-section in a horizontal plane of the active medium of an array of distributed Bragg reflector lasers formed by a combination of an electrically pumped array of stripe lasers and an unpumped array of gratings with different periodicities, according to yet another embodiment of the present invention.

Yet another embodiment of the present invention illustrated in FIG. 18 also does not require using overgrowth. The array (1800) of distributed Bragg reflector lasers is formed on a single semiconductor laser diode chip. The array consists of two section. In the active section (1810), all lasers (1811), (1812), (1813), (1814), (1815) are electrically pumped and do not contain gratings. In the passive unpumped section (1850) the grooves are etched through the active region, and the gratings (1851), (1852), (1853), (1854), (1855) are formed such that the gratings are present at the level, where the optical field of the vertical optical mode has maximum intensity. The gratings (1851), (1852), (1853), (1854), (1855) are distributed Bragg reflectors. They are preferably fabricated close to the read facet (1870) of the device and an antireflecting coat (1871) is preferably deposited onto the rear facet (1870). The antireflecting coat strongly suppresses reflection of the optical modes from the rear facet. Practically all the reflection occurs due to distributed Bragg reflectors, which have different periodicities and thus have maximum reflectivity at different wavelengths. Thus, the array of distributed Bragg reflector lasers emit laser light at a plurality of wavelengths.

Figure 19A:
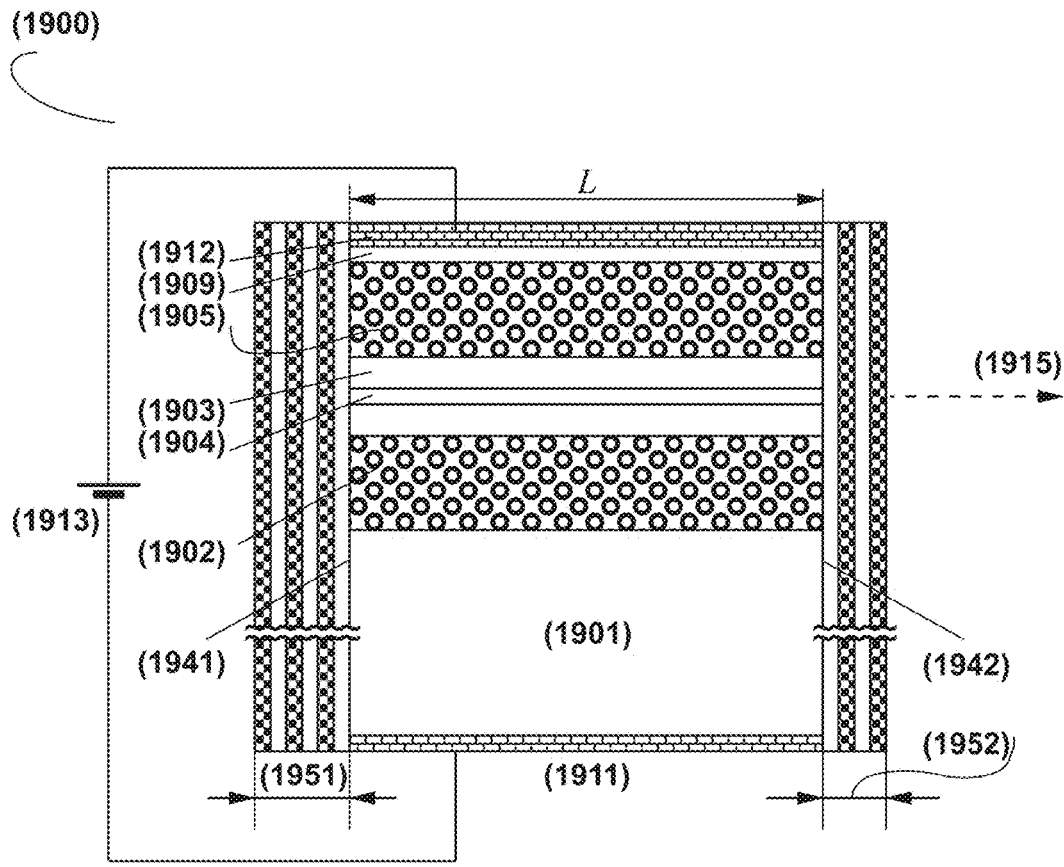
FIG. 19A. Schematic cross-section in a vertical plane of a multiwavelength laser source on a single semiconductor chip realized by a COMB laser, according to a further embodiment of the present invention.

FIG. 19A illustrates schematically a multiwavelength source of laser light (1900), according to a further embodiment of the present invention. The laser (1900) is a COMB laser emitting laser light at multiple wavelengths. The COMB laser (1900) is grown epitaxially on a substrate (1901). The substrate (1901) is preferably n-doped and a bottom, n-contact (1911) is mounted. The epitaxial structure includes a bottom, n-doped cladding (1902), a waveguide (1903) that is preferably undoped or weakly doped, into which the active medium (1904) is introduced and a top, p-doped cladding (1905). The p-contact layer (1909) is formed on top of the p-cladding (1905) and a top, p-contact (1912) is mounted on top of the contact layer (1909). A forward bias (1913) is applied to the active region (1904) via the top (1912) and bottom (1911) contacts. The semiconductor chip is bounded by a rear facet (1941) and a front facet (1942).

Figure 19B:
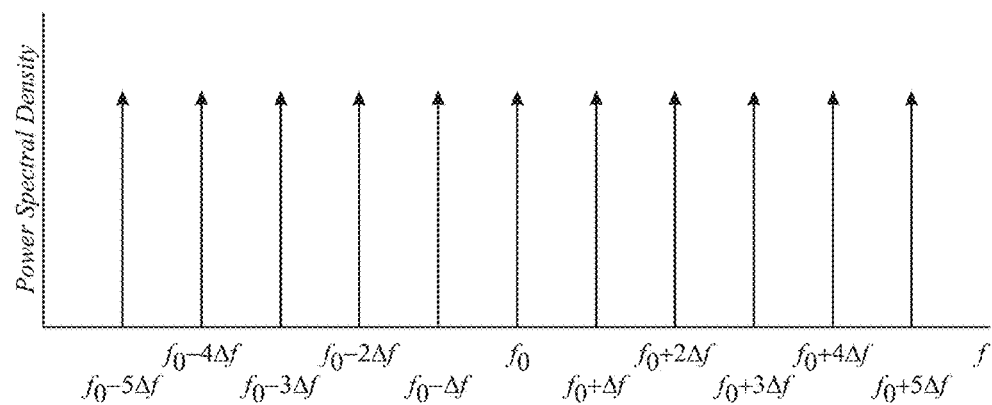
FIG. 19B. Power spectral density of the COMB laser of FIG. 19A showing multiple wavelengths of the laser emission.

To render the laser (1900) operate as a COMB laser, two criteria need to be met. First, the gain spectrum of the active region (1904) should be broad, preferably a few tens of nanometers. Second, the cavity length L should be rather short. The round trip equation for the longitudinal optical wave in a Fabry-Perot resonator yields frequencies of the electromagnetic wave in the longitudinal modes $$2n_{eff} \frac{2\pi f}{c} L = 2\pi m, \tag{10}$$

where f is the frequency of electromagnetic wave, c is the velocity of light in the vacuum and m is an integer number. Since Eq. (10) has multiple solutions for different integer numbers m, the power spectral density of the emitted light (FIG. 19B) contains a comb of different frequencies.

The spectral separation between the neighboring longitudinal modes refers to a change of the integer number m in Eq. (10) by one. In terms of the wavelengths, $$\Delta\lambda = \frac{\lambda^2}{2n_{\it eff}L}. \qquad (11)$$

Substituting in Eq. (11) the values $\lambda$=500 nm, $n_{\it eff}$=3.5 and L=0.5 mm, on obtains $\Delta\lambda$=0.07 nm. For a significantly shorter cavity, L=0.1 mm, the spectral separation between the neighboring modes is $\Delta\lambda$=0.35 nm. Ultra short cavities imply very high external losses. To promote lasing, using of highly reflecting coats is necessary. In FIG. 19A the highly reflecting coat (1951) deposited on the rear facet (1941) is thicker and has a higher reflectivity than the highly reflecting coat (1952) deposited on the front facet (1942). Thus, the laser light (1915) is emitted through the front facet.

Figure 20:
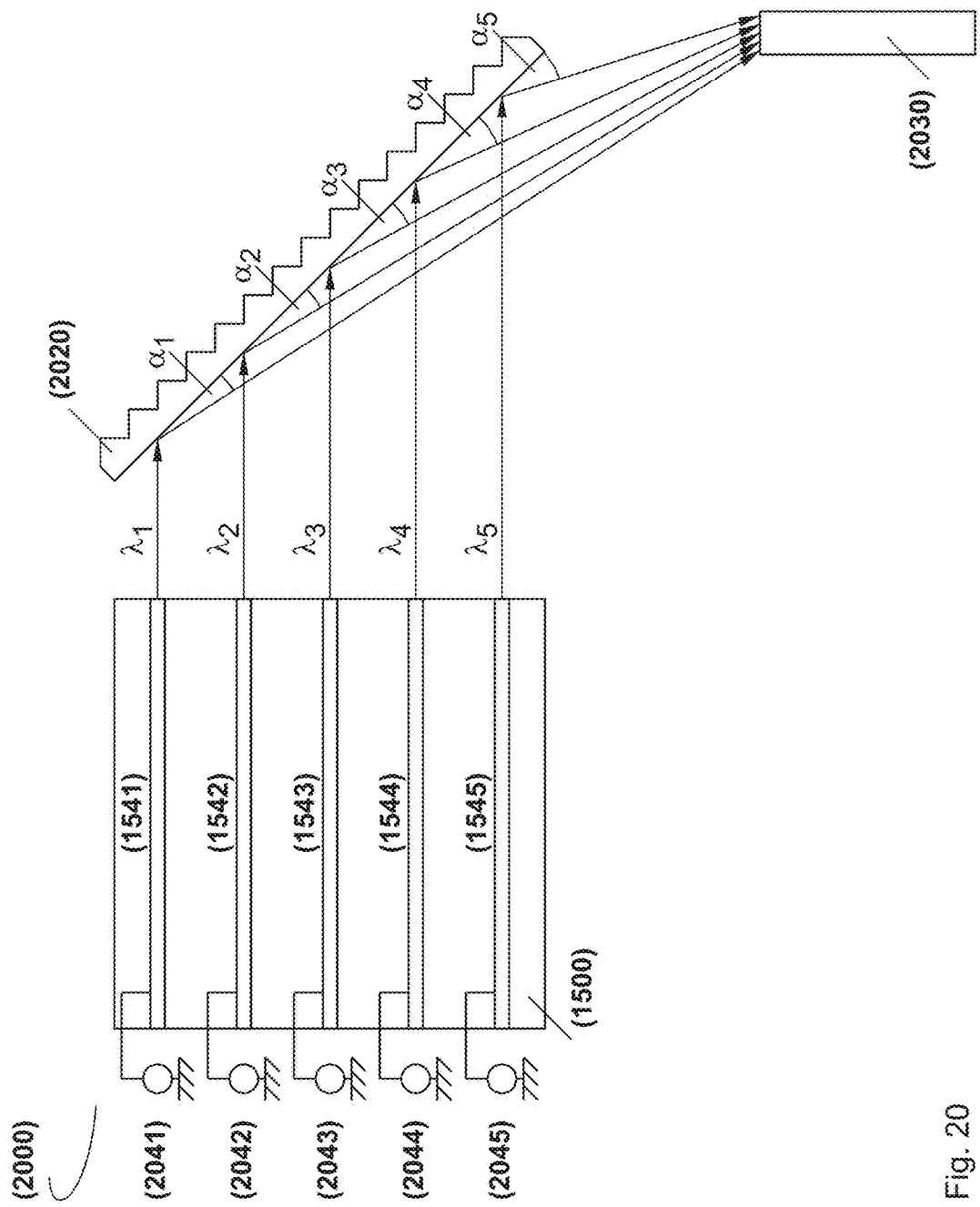
FIG. 20. An optical system combining into a single waveguide the laser light emitted at different wavelengths by the array of distributed feedback lasers of FIG. 15, according to another embodiment of the present invention.

FIG. 20 illustrates an optical system (2000) combining into a single waveguide the laser light emitted at different wavelengths by the array of distributed feedback lasers of FIG. 15, according to another embodiment of the present invention. Each of the distributed feedback lasers of the array (1500) is controlled independently by its own driver. A driver (2041) is applied to the top contact (1541). Correspondingly, the drivers (2042), (2043), (2044), (2045) are applied to the top contacts (1542), (1543), (1544), (1545), respectfully. Laser light, emitted by different distributed feedback lasers of the same array (1500), having different wavelengths, impinges on the same diffraction grating (2020). The diffraction grating (2020) is configured such that the light at different wavelengths is diffracted at different angles. Thus, light having wavelengths $\lambda_1$, $\lambda_2$, $\lambda_3$, $\lambda_4$, $\lambda_5$ is diffracted at angle $\alpha_1$, $\alpha_2$, $\alpha_3$, $\alpha_4$, $\alpha_5$, respectfully. Then, all diffracted light impinges at a single waveguide (2030).

Figure 21C:
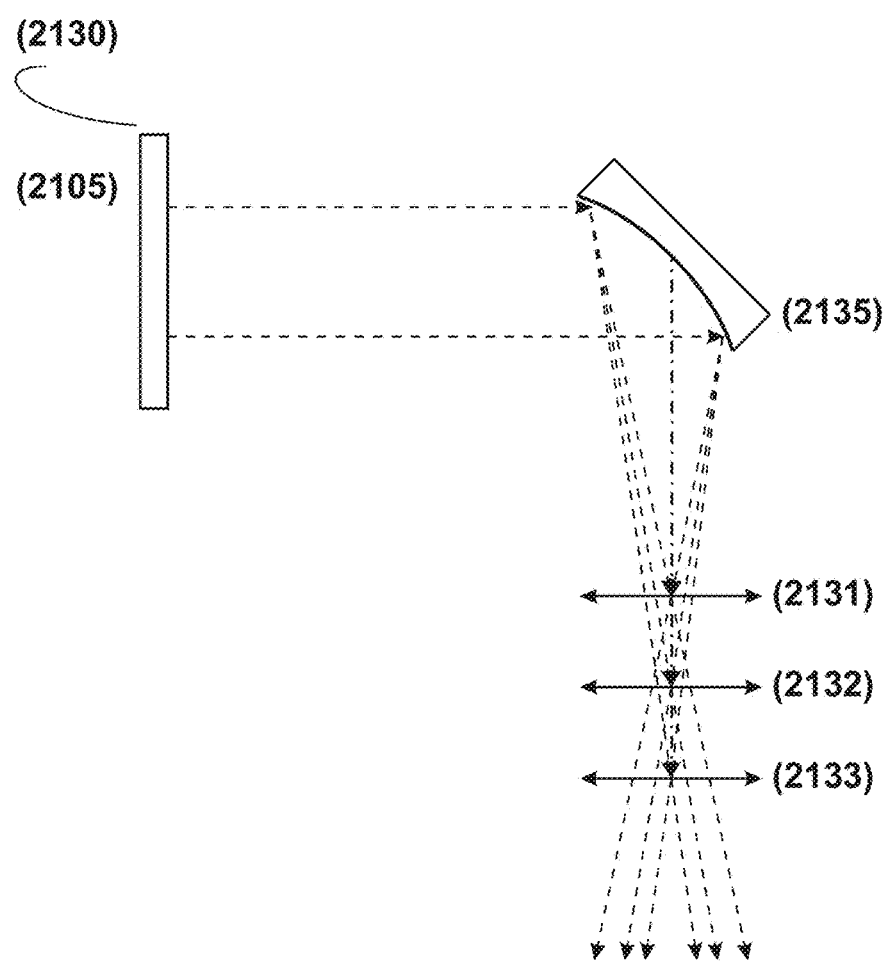
FIG. 21C. Formation of a three-dimensional image by directing the laser light at multiple wavelength onto an optical element having a wavelength-sensitive focal length, wherein the optical element is realized by a converging curved mirror having a wavelength-sensitive focal length, according to another embodiment of the present invention.

FIGS. 21A through 21F illustrate formation of three-dimensional images by using optical units having a wavelength-sensitive focal length, according to various embodiments of the present invention. FIG. 21A shows an optical system (2110) comprising a transmissive two-dimensional display (2105) and an optical unit realized by a converging lens (2115). Laser light generated at multiple wavelengths illuminates the two-dimensional display (2105) and transmitted light is further directed onto the converging lens (2115), the focal length of which is wavelength sensitive. FIG. 21A schematically illustrates that light at different wavelengths form real two-dimensional images (2111), (2112), (2113) at different depths and a plurality of images can be perceived by the human's eyes as a three-dimensional image.

FIG. 21B shows an optical system (2120) comprising a transmissive two-dimensional display (2105) and an optical unit realized by a diverging lens (2125), according to a further embodiment of the present invention. Laser light generated at multiple wavelengths illuminates the two-dimensional display (2105) and transmitted light is further directed onto the diverging lens (2125), the focal length of which is wavelength sensitive. FIG. 21B schematically illustrates that light at different wavelengths form virtual two-dimensional images (2121), (2122), (2123) at different depths and a plurality of images can be perceived by the human's eyes as a three-dimensional image.

FIG. 21C shows an optical system (2130) comprising a transmissive two-dimensional display (2105) and an optical unit realized by a converging curved mirror (2135), according to another embodiment of the present invention. Laser light generated at multiple wavelengths illuminates the two-dimensional display (2105) and transmitted light is further directed onto the converging curved mirror (2135), the focal length of which is wavelength sensitive. FIG. 21C schematically illustrates that light at different wavelengths form real two-dimensional images (2131), (2132), (2133) at different depths and a plurality of images can be perceived by the human's eyes as a three-dimensional image.

Figure 21D:
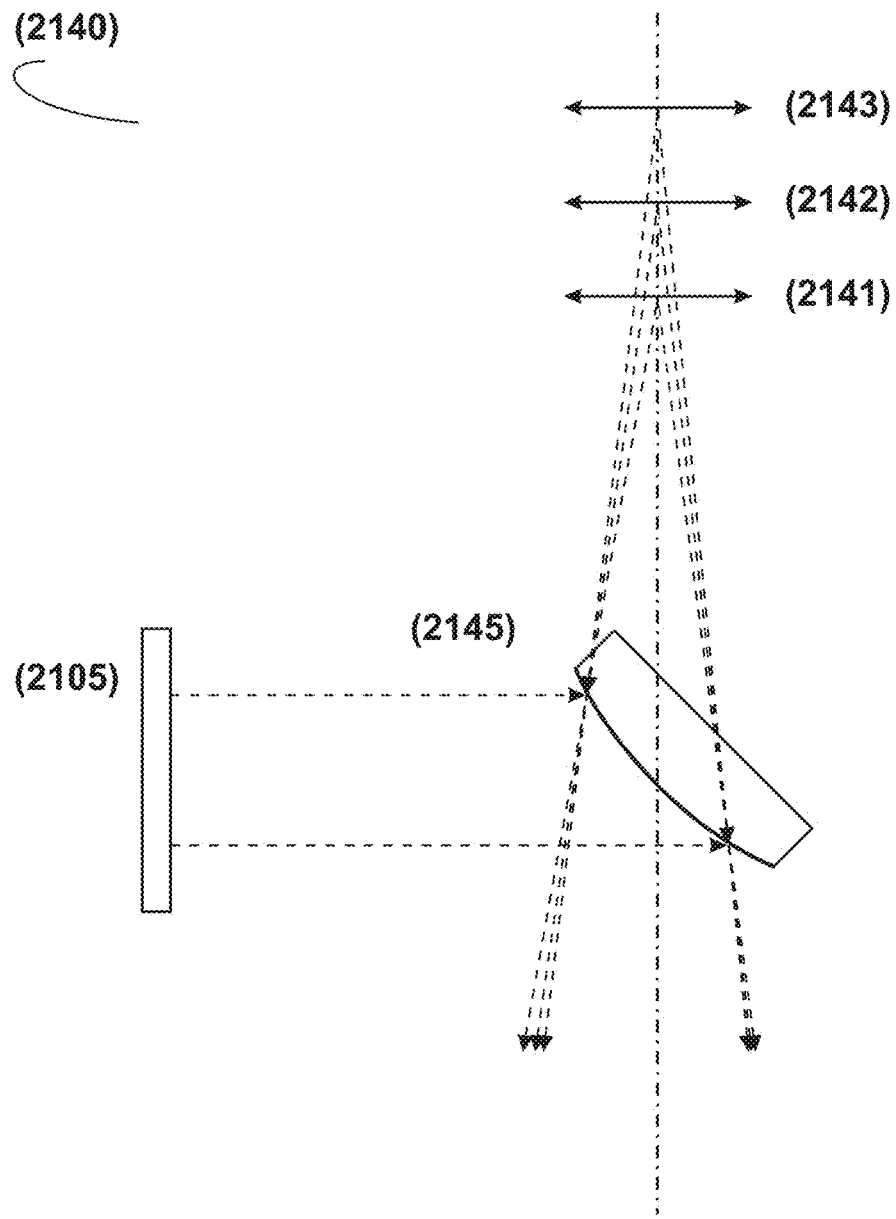
FIG. 21D. Formation of a three-dimensional image by directing the laser light at multiple wavelength onto an optical element having a wavelength-sensitive focal length, wherein the optical element is realized by a diverging curved mirror having a wavelength-sensitive focal length, according to yet another embodiment of the present invention.

FIG. 21D shows an optical system (2140) comprising a transmissive two-dimensional display (2105) and an optical unit realized by a diverging curved mirror (2145), according to yet another embodiment of the present invention. Laser light generated at multiple wavelengths illuminates the two-dimensional display and transmitted light is further directed onto the diverging curved mirror (2145), the focal length of which is wavelength sensitive. FIG. 21D schematically illustrates that light at different wavelengths form virtual two-dimensional images (2141), (2142), (2143) at different depths and a plurality of images can be perceived by the human's eyes as a three-dimensional image.

Figure 21E:
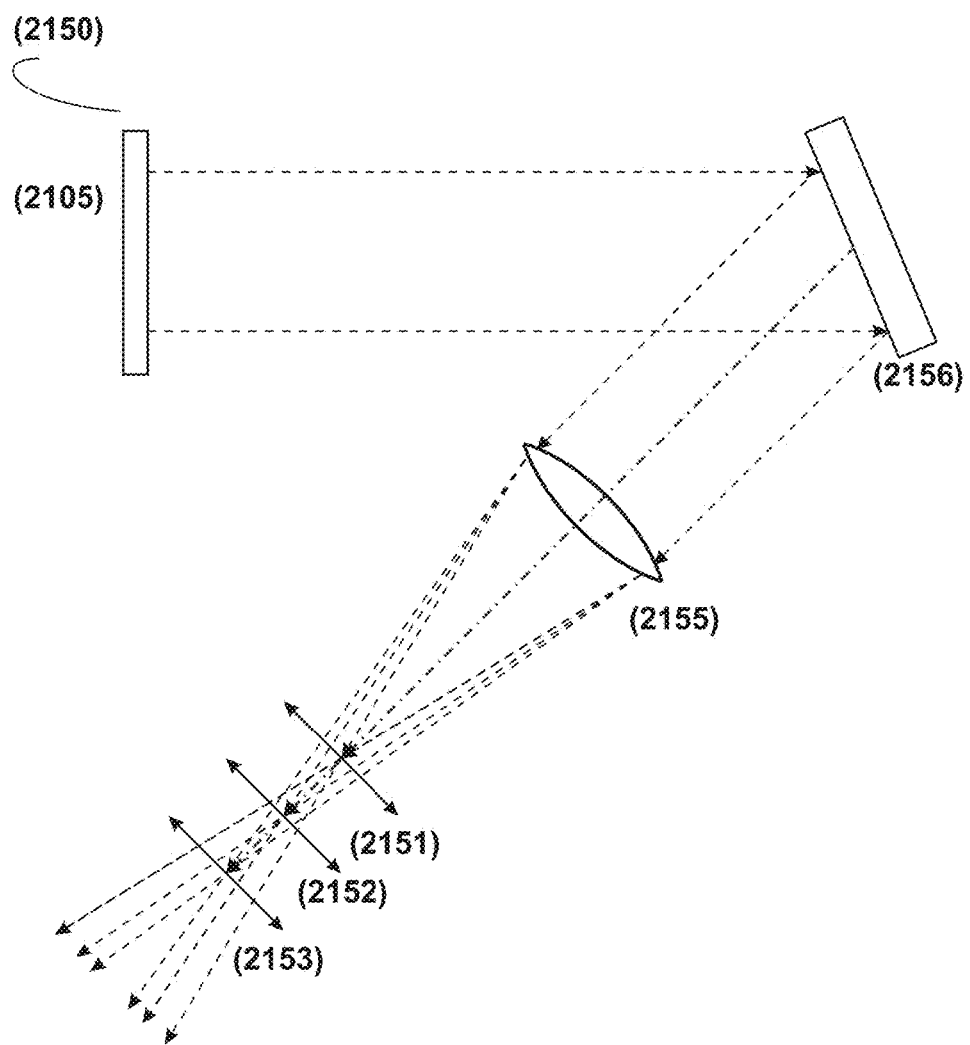
FIG. 21E. Formation of a three-dimensional image by directing the laser light at multiple wavelength onto an optical element having a wavelength-sensitive focal length, wherein the optical element is realized by a combination of a flat mirror and a converging lens having a wavelength-sensitive focal length, according to a further embodiment of the present invention.

FIG. 21E shows an optical system (2150) comprising the transmissive two-dimensional display (2105) and an optical unit realized by a combination of a flat mirror (2156) and a converging lens (2155), according to a further embodiment of the present invention. Laser light generated at multiple wavelengths illuminates the two-dimensional display (2105) and the transmitted light is further directed onto the flat mirror (2156), reflected from it and further directed onto the converging lens (2155), the focal length of which is wavelength sensitive. FIG. 21E schematically illustrates that light at different wavelengths form real two-dimensional images (2151), (2152), (2153) at different depths and a plurality of images can be perceived by the human's eyes as a three-dimensional image.

Figure 21F:
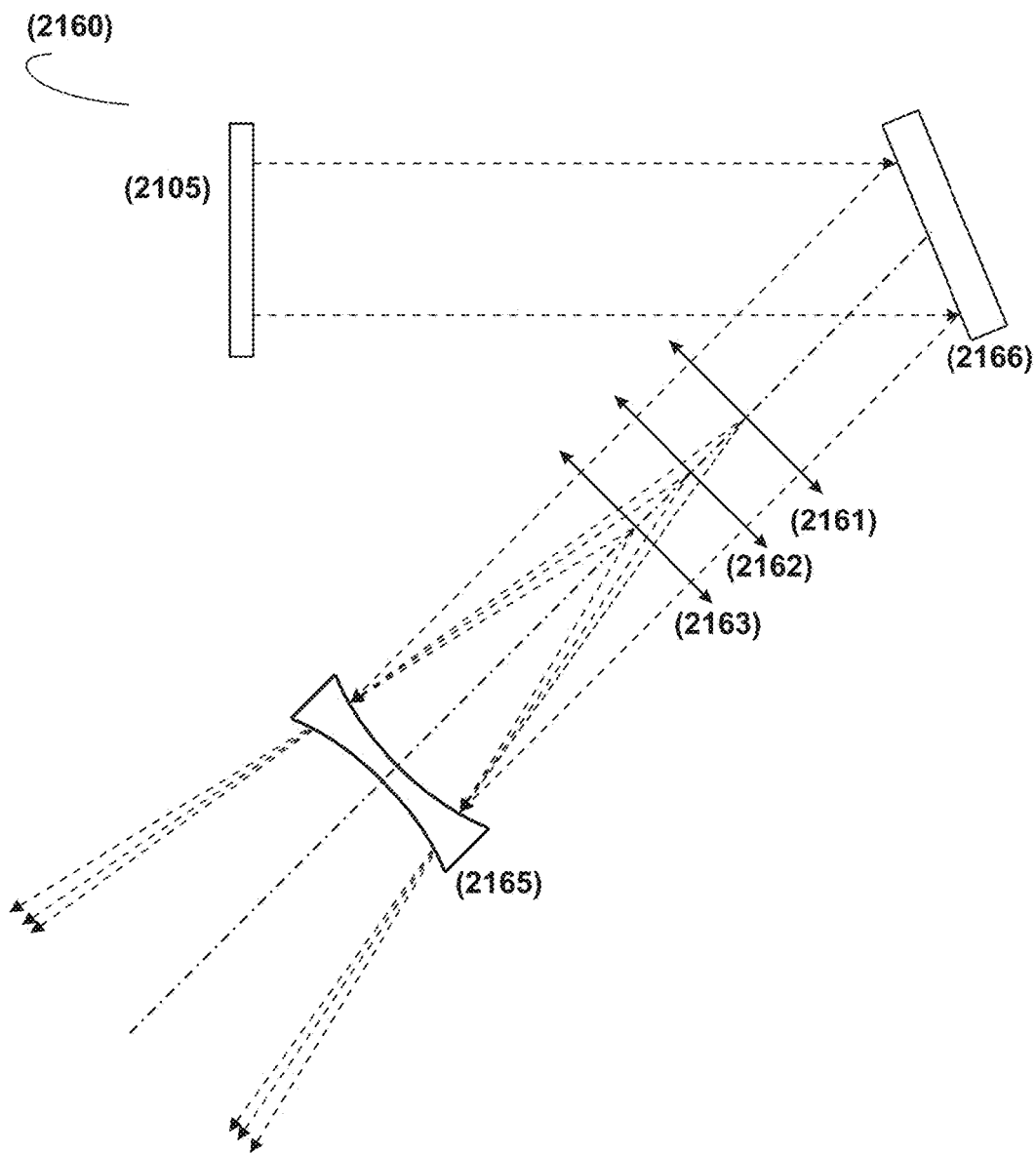
FIG. 21F. Formation of a three-dimensional image by directing the laser light at multiple wavelength onto an optical element having a wavelength-sensitive focal length, wherein the optical element is realized by a combination of a flat mirror and a diverging lens having a wavelength-sensitive focal length, according to another embodiment of the present invention.

FIG. 21F shows an optical system (2160) comprising a transmissive two-dimensional display (2105) and an optical unit realized by a combination of a flat mirror (2166) and a diverging lens (2165), according to another embodiment of the present invention. Laser light generated at multiple wavelengths illuminates the two-dimensional display (2105), and transmitted light is further directed onto the flat mirror (2166), reflected from it and further directed onto the diverging lens (2165), the focal length of which is wavelength sensitive. FIG. 21F schematically illustrates that light at different wavelengths form virtual two-dimensional images (2161), (2162), (2163) at different depths and a plurality of images can be perceived by the human's eyes as a three-dimensional image.

A one skilled in the art will appreciate that, similarly to the transmissive two-dimensional display (2105), a reflective two-dimensional display can be applied, and laser light, illuminating the display and reflected from the display can further be directed to an optical units having a wavelength sensitive focal length. Then a plurality of real or virtual two-dimensional images will be formed at different depths, which also can be perceived by human's eyes as a three-dimensional image. Different realizations of optical units similar to those of FIGS. 21A through 21F are possible for reflective displays as well.

Figure 22:
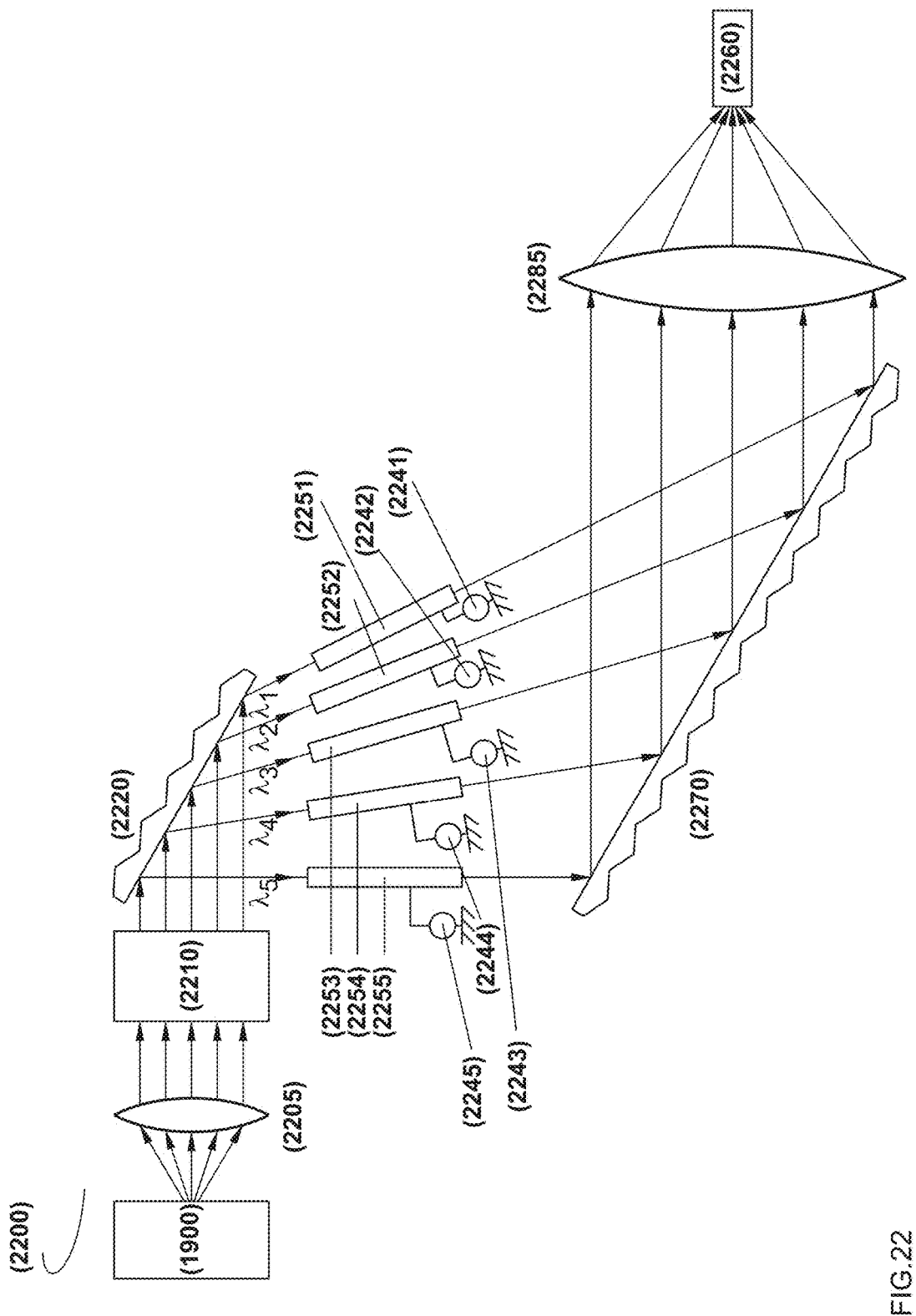
FIG. 22. An optical system splitting laser light emitted by a COMB laser at a plurality of wavelengths, controlling light at each wavelength separately and combing all light into a single waveguide, according to yet another embodiment of the present invention.

Whereas an array of distributed feedback lasers (1500), (1700), and an array of distributed Bragg reflector lasers (1800) allow an independent control of a laser source at each single wavelength by applying separately a bias to each contact, such approach is not possible for a COMB laser (1900). In order to control independently laser source at each wavelength in the case of a COMB laser, additional means is required. FIG. 22 illustrates schematically an optical system (2200) that realizes such approach, according to yet another embodiment of the present invention. Laser light generated at multiple wavelengths by a COMB laser (1900) is collimated by a collimating lens (2205) and is directed to a waveguide (2210). After passing the waveguide (2210) light impinges on a splitter which is realized by a first diffraction grating (2220). Light having different wavelengths is diffracted by the diffraction grating (2220) at different angles. Then it becomes possible to control light at every single wavelength independently. Light at a wavelength $\lambda q$ propagates through a modulator (2251), which is controlled by a driver (2241). Preferred is using a Mach-Zehnder electrorefraction (or electro-optic) modulator. In a further embodiment of the present invention, an electroabsorption modulator is used to modulate the intensity of laser light. Light generated at different wavelengths $\lambda_2$, $\lambda_3$, $\lambda_4$, $\lambda_5$ propagates through one of different modulators (2252), (2253), (2254), (2255), which are controlled by the drivers (2242), (2243), (2244) and (2245) respectfully. After passing the modulators, light at all wavelengths impinges on a second diffraction grating (2270). The second diffraction grating (2270) is preferably configured similarly as the first diffraction grating (2220), such that the diffraction angle of light at both diffraction gratings is the same. Then, after passing two diffraction gratings, the lasers beams at different wavelengths form again a parallel beam. Then light at all wavelengths is focused by a converging lens (2285) and enters the waveguide (2260). Thus the optical system (2200) combines laser light at multiple wavelengths in the same waveguide and at the same time enables switching on and off and controlling intensity at every single wavelength independently.

However, the optical system does not provide a solution for temporal separation of pulses of laser light at different wavelengths, since a single COMB laser (1900) emits pulses that contain laser light at all wavelengths within the gain spectrum, once laser in on, and no laser light once laser is off.

Figure 23:
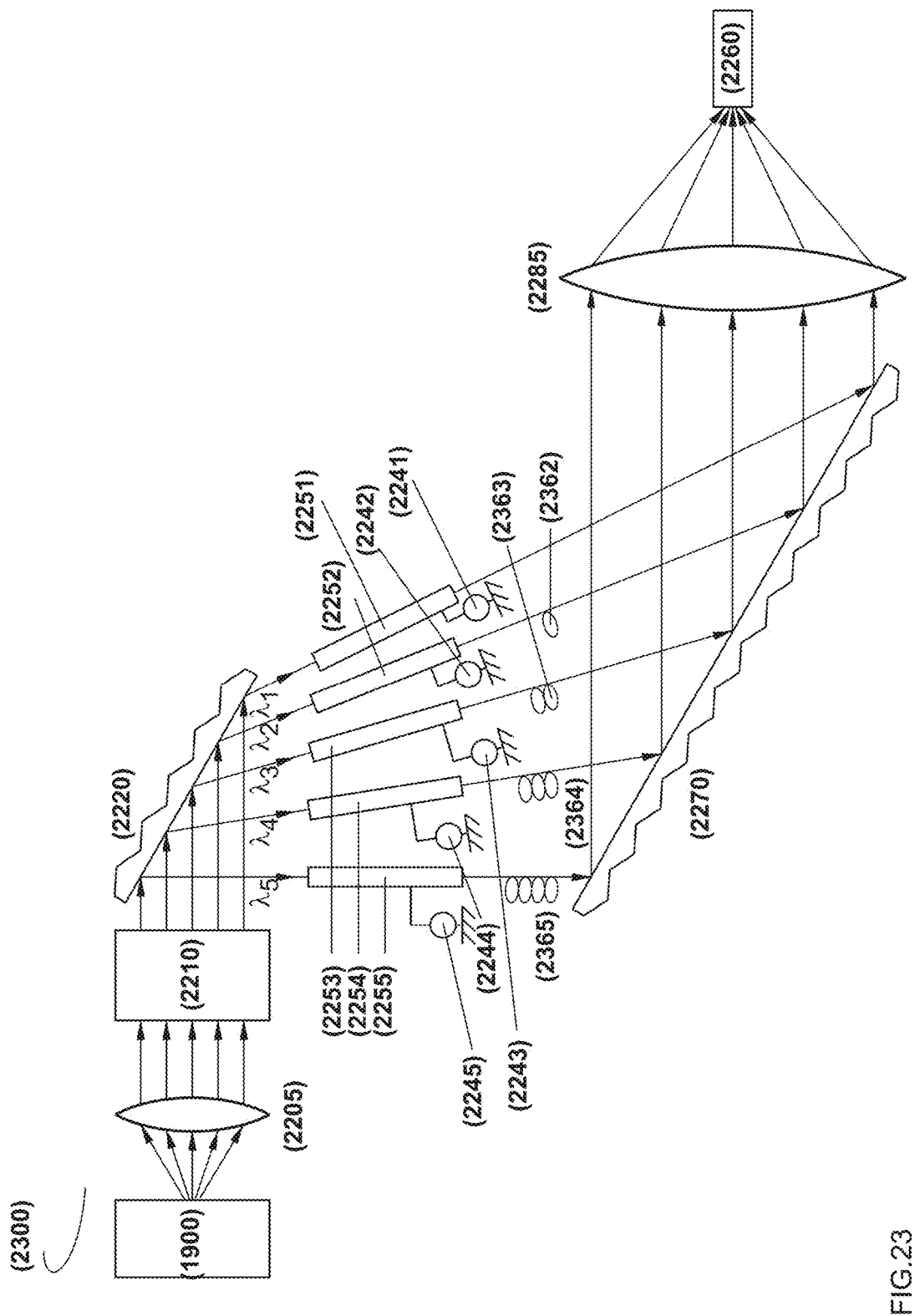
FIG. 23. An optical system based on a COMB laser, into which delay lines are added as compared to the embodiment of FIG. 22, according to a further embodiment of the present invention.

A further embodiment of the present invention, illustrated in FIG. 23, provides such a solution. The optical system (2300) contains, in addition to the optical system (2200), delay lines resulting in a different delay time for each emitted wavelength. The channel, along which laser light at the wavelength $\lambda_1$ propagates, contains no delay line. The laser light at the wavelength $\lambda_2$ propagates along the delay line (2362). The laser light at the wavelengths $\lambda_3$, $\lambda_4$, $\lambda_5$, propagates along the delay lines (2363), (2364), (2365), respectively, the length of the delay lines increasing along the sequence (2362)→(2363)→(2364)→(2365) which is illustrated by using an increasing number of ellipses marking each delay lines.

Figure 24:
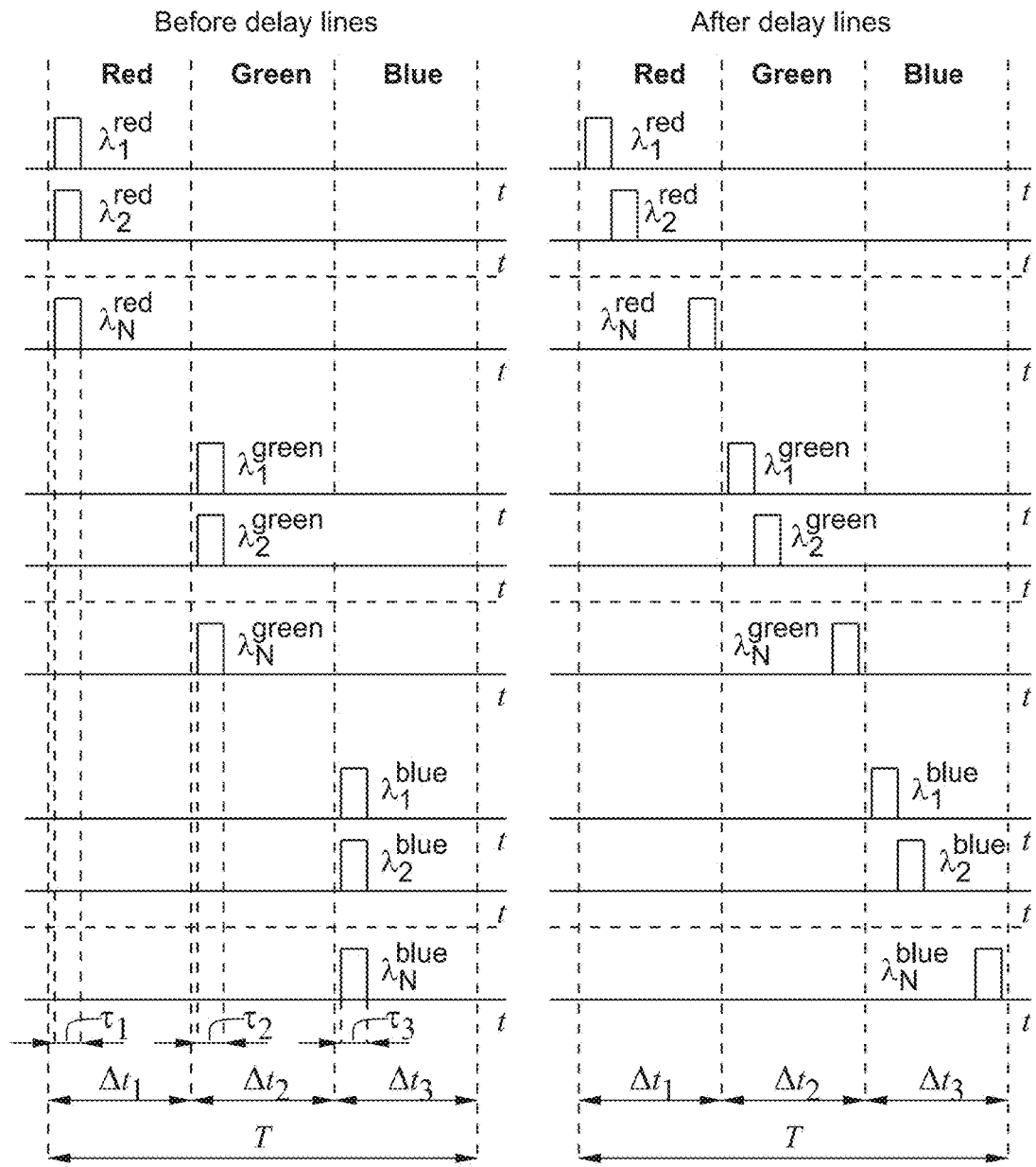
FIG. 24. Temporal sequence of light pulses at all wavelengths of the optical system of FIG. 23, before and after delay lines.

FIG. 24 illustrates the temporal sequence of pulses of the laser light before and after delay lines. FIG. 24 refers to an optical system, in which one COMB laser is used for the red spectral range, one COMB laser is applied as a multiple wavelength source in the green spectral range and one COMB laser operates in the blue spectral range. The duty cycle having the duration T consists of three time intervals, $\Delta t_1$, $\Delta t_2$, $\Delta t_3$. During a short time interval $\tau_1$ within the time interval $\Delta t_1$ the red light source is on, the green laser is switched on during a short time interval $\tau_2$ within the time interval $\Delta t_2$ and the blue laser is switched on during a short time interval $\tau_3$ within the time interval $\Delta t_3$, After delay lines, the pulses of red light at different wavelengths form a train of non-overlapping pulses over the time interval $\Delta t_1$. Similarly, the pulses of green light at different wavelengths form a train of non-overlapping pulses over the time interval $\Delta t_2$ and the pulses of blue light at different wavelengths form a train of non-overlapping pulses over the time interval $\Delta t_3$. A one skilled in the art will appreciate that FIG. 24 refers to a particular embodiment, for which the number of different wavelengths used in the system, is the same for red, green and blue spectral ranges (the number equals N in FIG. 24). However, alternatively the number of different channels can be different for red, green and blue spectral range.

Thus the above described embodiments of FIG. 20 and FIG. 23 suggest using multiwavelength laser sources for red, green and blue spectral ranges, wherein each of the sources can be either an array of distributed feedback lasers fabricated on a single chip, or an array of distributed Bragg reflector lasers on a single chip, or a COMB laser, wherein the laser light at each wavelength can be separately controlled by a separate driver, and thus, a train of pulses non-overlapping in time, can be generated. Further, all this light illuminates a two-dimensional display and, after transmission through a transmissive display, or after reflection from a reflective display, light can be directed onto an optical unit having a wavelength-sensitive focal length as disclosed in FIGS. 21A through 21F. However, using such an approach and no further means would lead to the situation, in which the human's eyes perceive three three-dimensional images in red, green and blue colors as placed at three different locations as shown in FIG. 14D. Thus, an additional means is necessary to fuse these three images into a single image.

Figure 1:
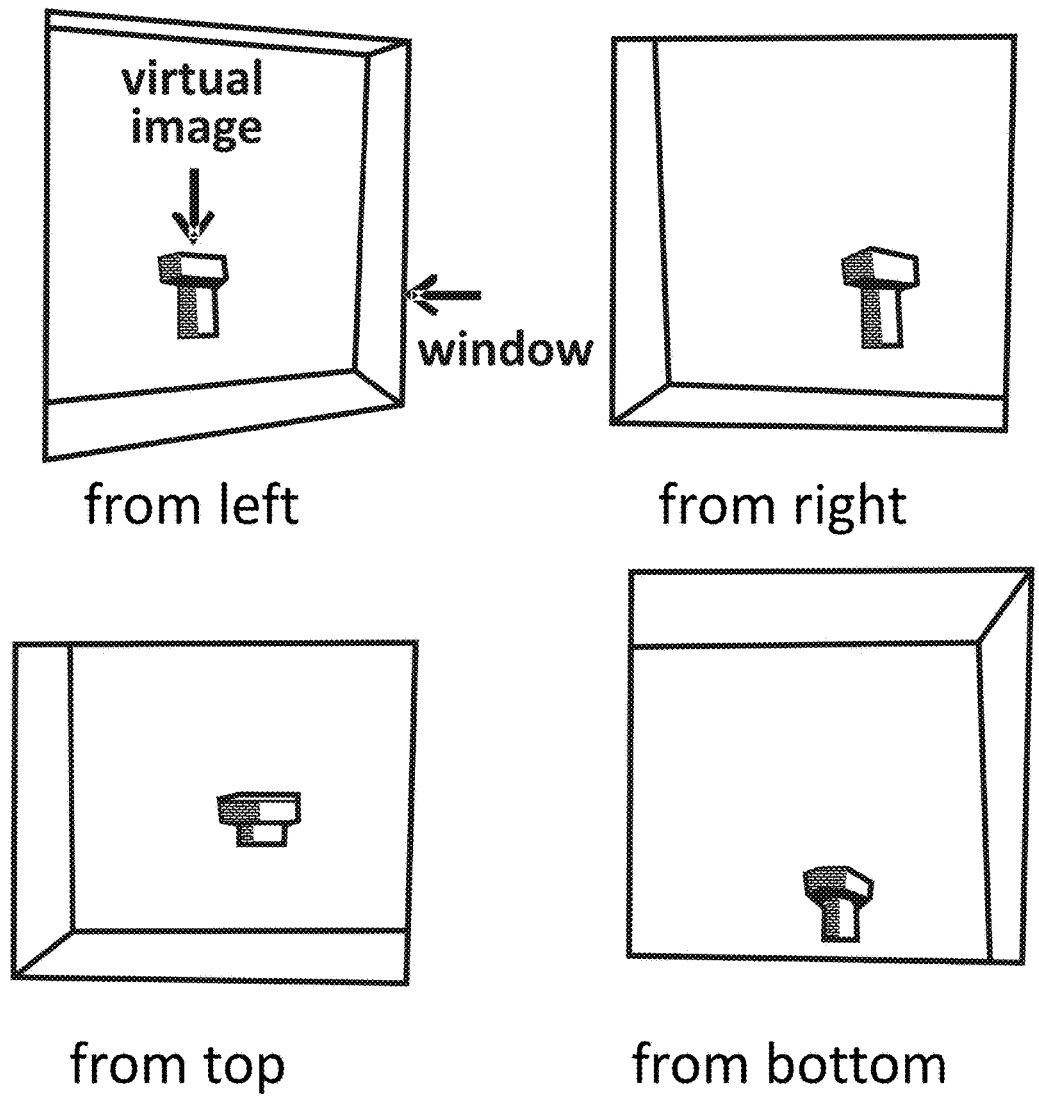
FIG. 1. A virtual image of an object perceived by the human's eyes according to a prior art device.
Figure 2:
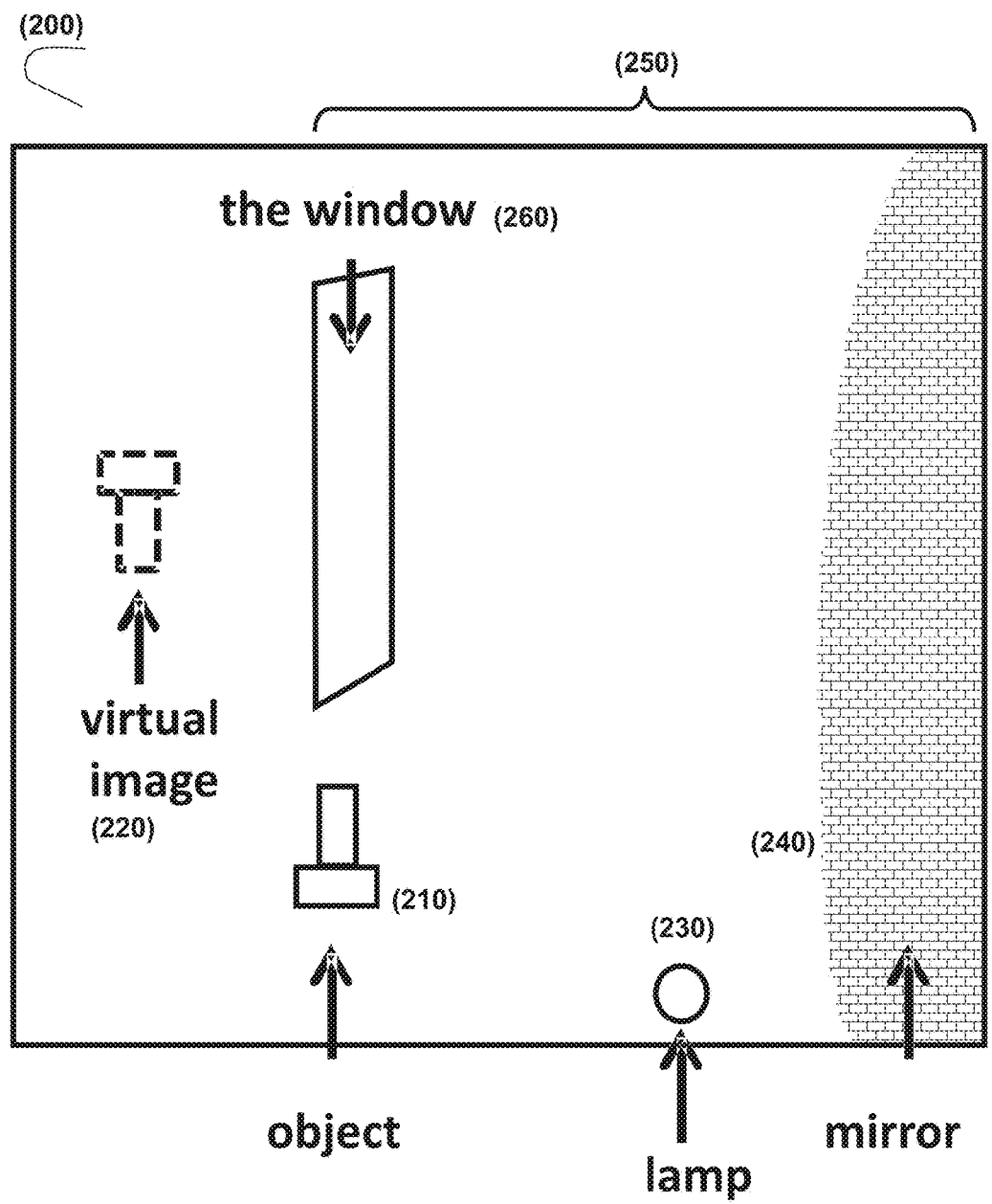
FIG. 2. Arrangement of the elements in a typical prior art device. A real object is illuminated by a lamp and the light coming from the object is reflected by a curved mirror through a window to form a virtual image perceived by the observer's eyes. The observer is looking at the window form outside, as depicted in FIG. 1.
Figure 3:
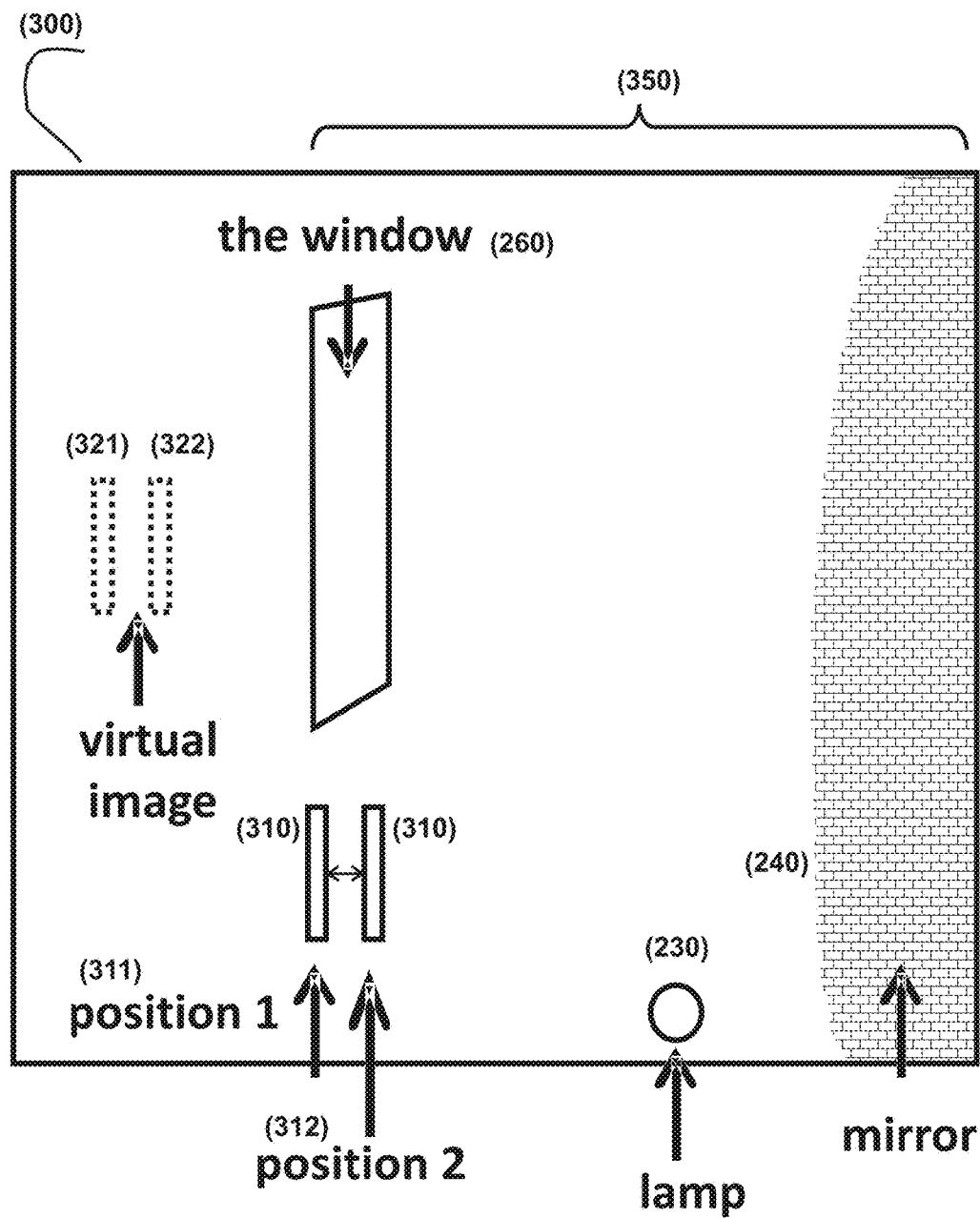
FIG. 3. A device similar to the one shown in FIG. 2, but with the real object replaced by a display. The display moves between two or more positions. The image on the display is changed while the display is moving. In this case a set of two-dimensional images is perceived by the human's eyes as a virtual three-dimensional image if the duty cycle is shorter than the averaging time of the human's eyes.
Figure 4A:
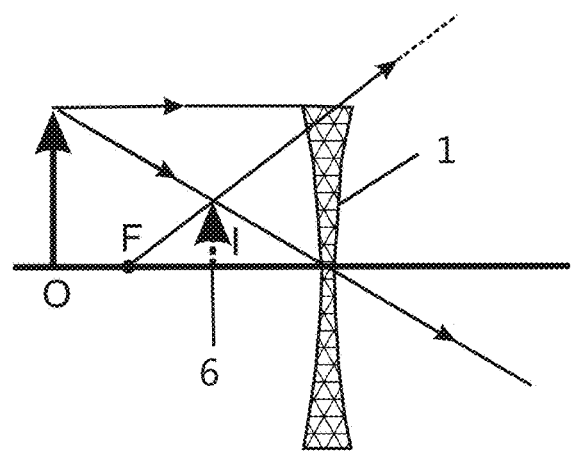
FIG. 4A. Schematic view of a prior art device generating virtual images based on a diverging lens.
Figure 4B:
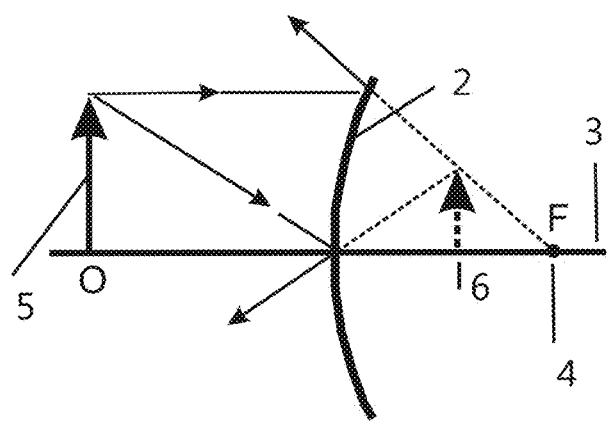
FIG. 4B. Schematic view of a prior art device generating virtual images based on a curved mirror, wherein the virtual image is reduced with respect to the real object.
Figure 4C:
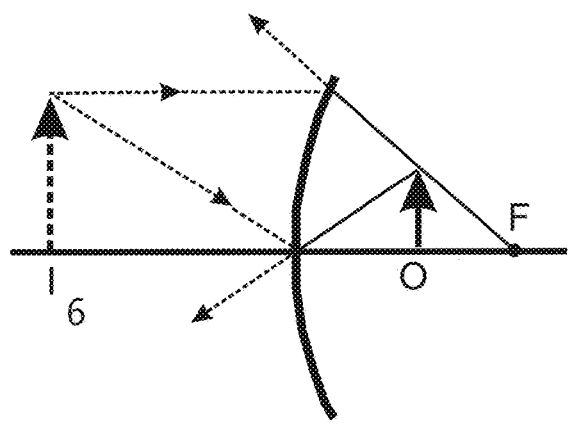
FIG. 4C. Schematic view of a prior art device generating virtual images based on a curved mirror, wherein the virtual image is enlarged with respect to the real object.
Figure 5A:
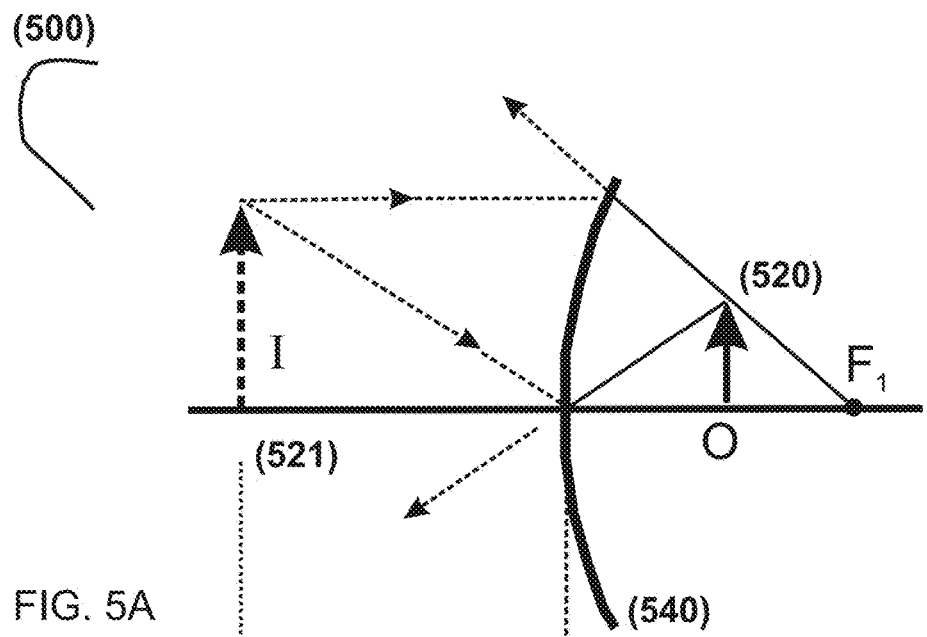
FIGS. 5A and 5B. Schematic view of a device generating three-dimensional virtual images based on a deformable curved mirror.
Figure 5B:
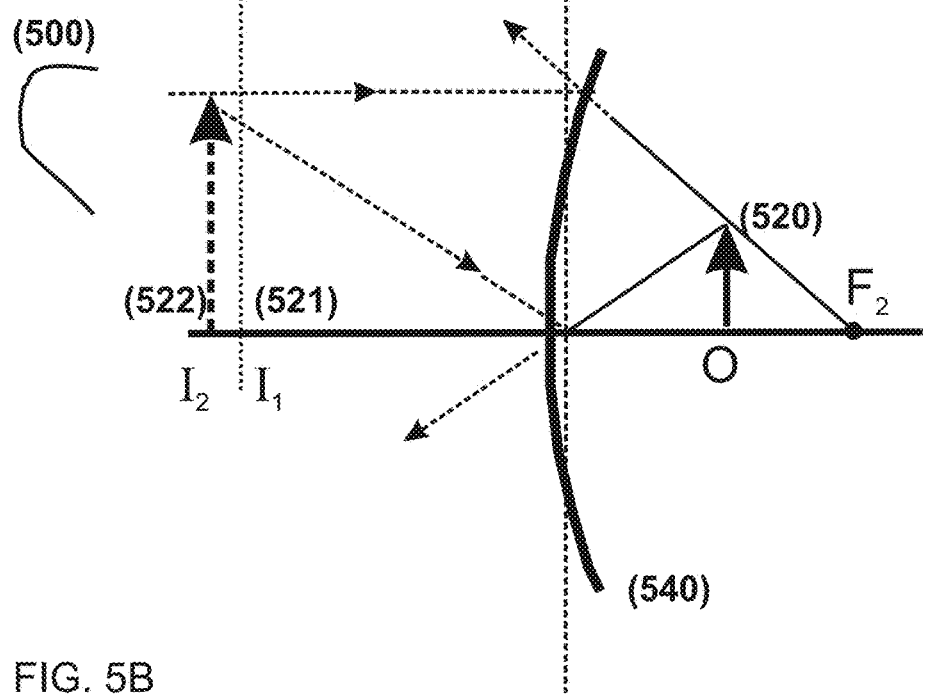
Figure 6:
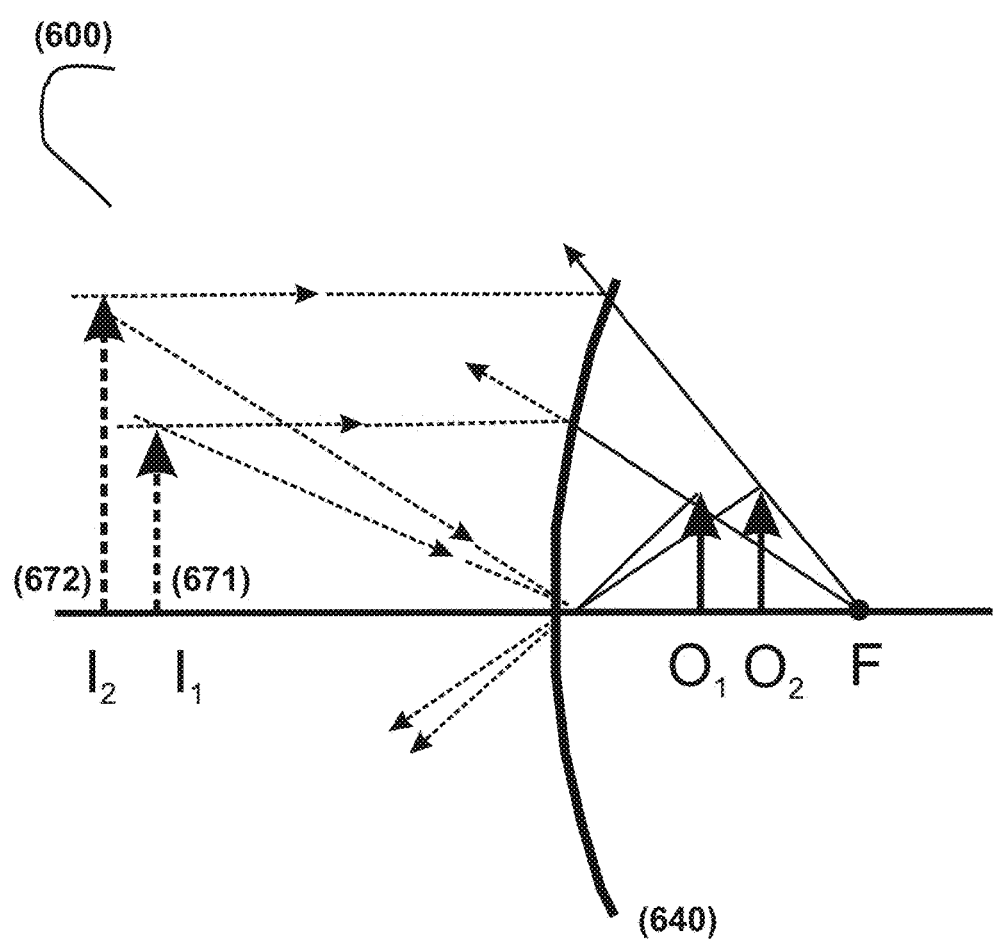
FIG. 6. Schematic view of a device generating three-dimensional virtual images based on a focus-adjustable mirror (640) with a wavelength-sensitive focal length. Virtual images created by light with different wavelengths within the same basic color range are generated at different depths and the set of these virtual images can be perceived by the human's eyes as a three-dimensional image in the corresponding color. Three-dimensional images generated in each of the basic colors (red, green and blue) can be merged into a single fully colored 3D image by the adjustability of the focal length of the mirror. Such adjustability of the focal length can be achieved by various methods, including i) mechanical motion of the mirror with respect to the display, ii) using electro-optic effect-induced change of the refractive index of the material of the mirror, and, thus, of the focal length or the mirror, iii) applying thermal effect-induced change of the refractive index of the material and, thus, of the focal length of the mirror, iv) using acousto-optic effect-induced change of the refractive index of the materials, and, thus, of the focal length of the mirror, v) using the electric field-induced change of the shape of the mirror, and, thus, of its focal length, vi) applying a mirror or a lens reconfigurable due to using micro-electro-mechanic systems (MEMS).
Figure 7:
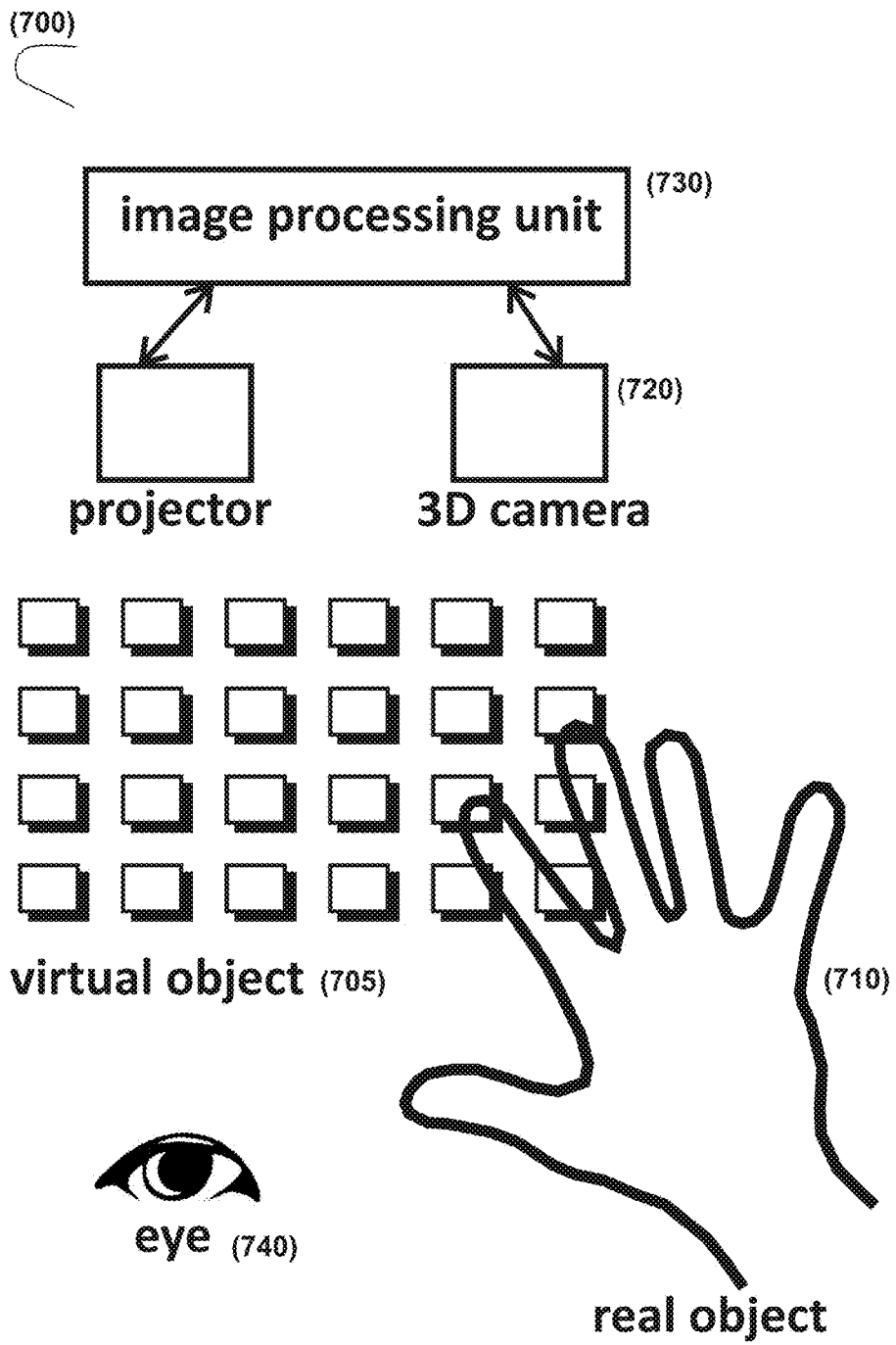
FIG. 7. Schematic view of an interactive system composed of: a projection display generating virtual image that is perceived by the observer's eyes as a three-dimensional image, a real object, a camera suitable for taking three-dimensional pictures and an image-processing system, which aligns the geometrical characteristics of a real object with the geometrical characteristics of the virtual image.
Figure 8:
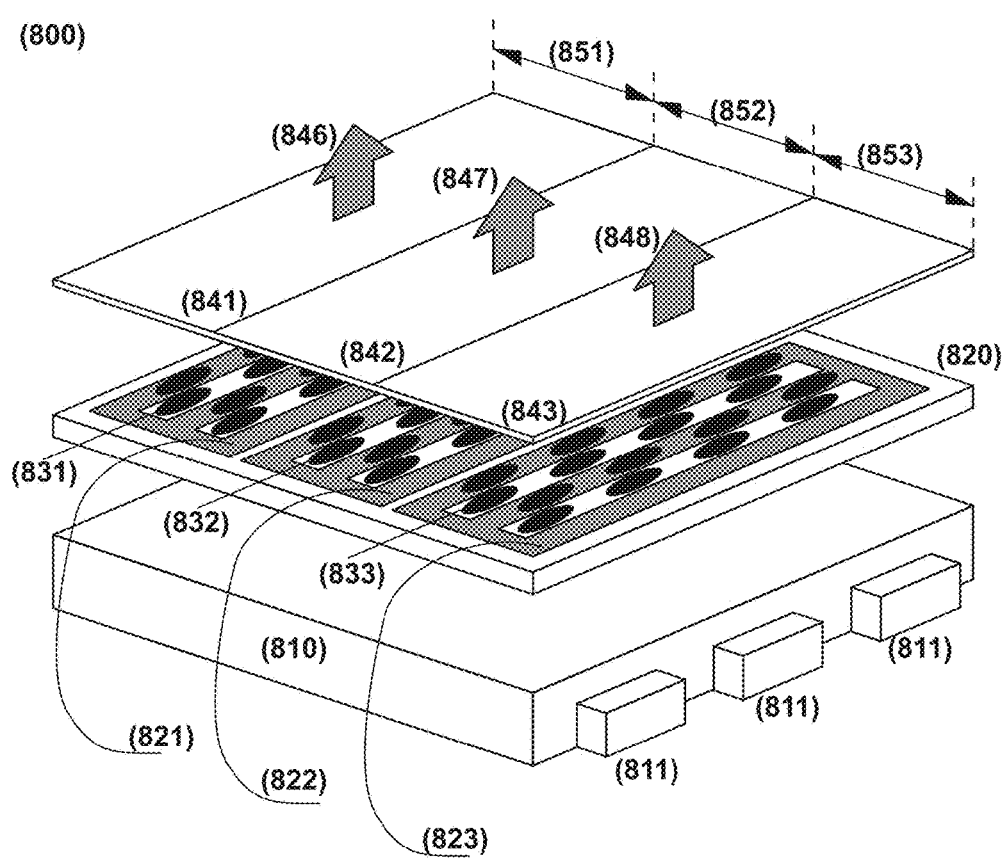
FIG. 8. Schematic view of a prior art liquid crystal display.
Figure 9:
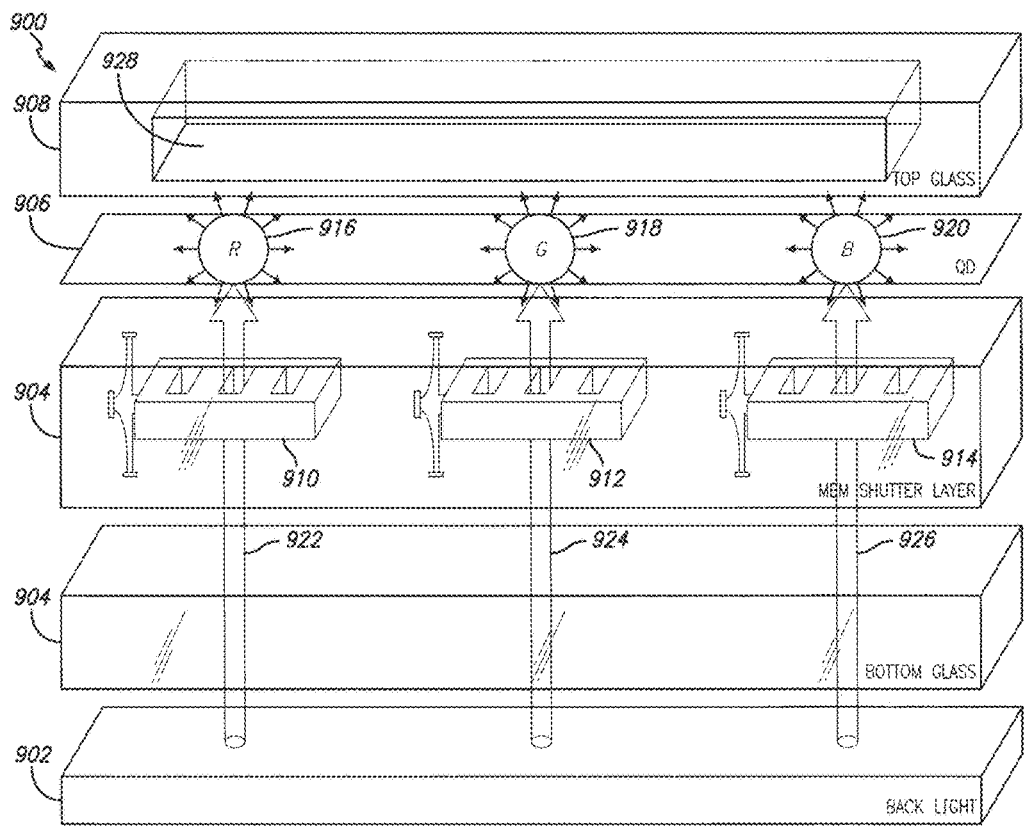
FIG. 9. Schematic view of a prior art display based on microelectromechanical system (MEMS).
Figure 10:
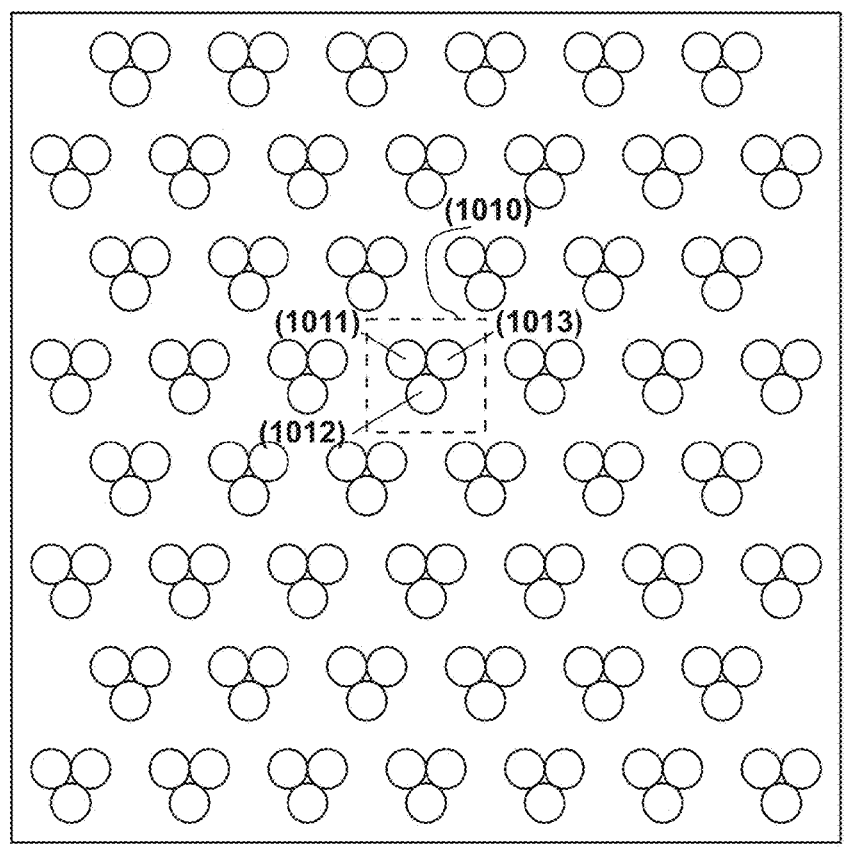
FIG. 10. Schematic view of a prior art colored display based on light-emitting diodes.
Figure 11:
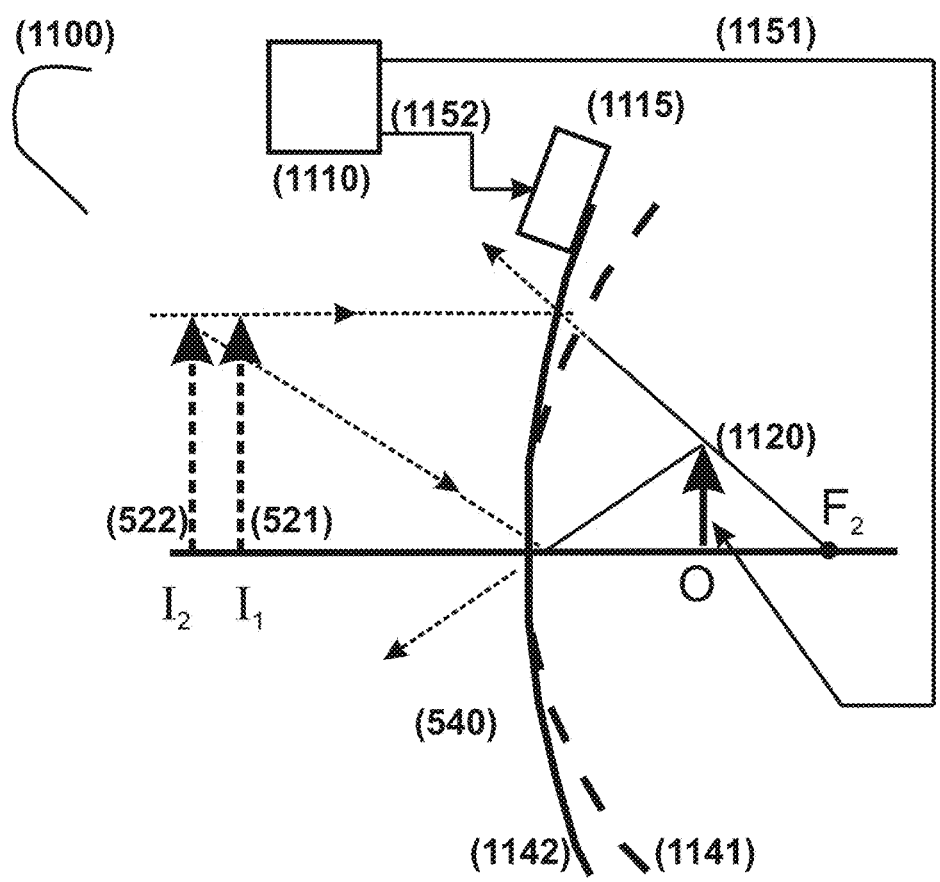
FIG. 11. Schematic view of a device generating three-dimensional virtual images based on a variable-focus deformable curved mirror.
Figure 12A:
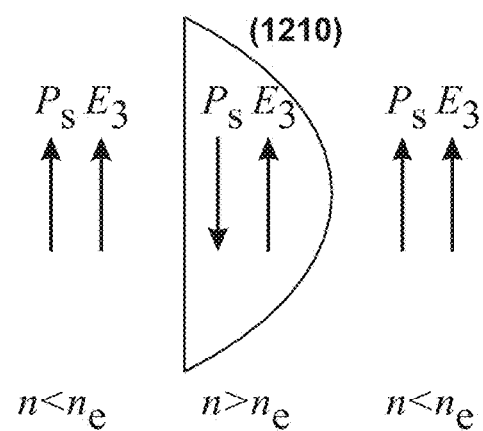
FIG. 12A. Plano-convex domain in a ferro-electric with a reversed polarization.
Figure 12B:
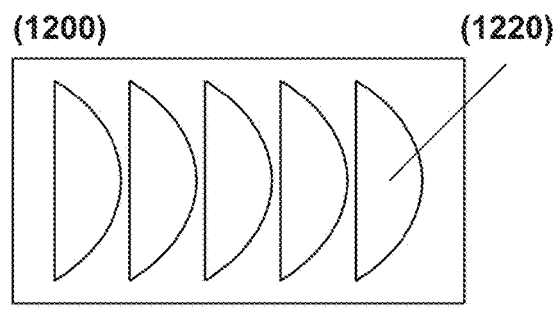
FIG. 12B. Top view on a stack of electro-optic lenses formed by planoconvex domains with the reverse polarization in a ferro-electric material.
Figure 12C:
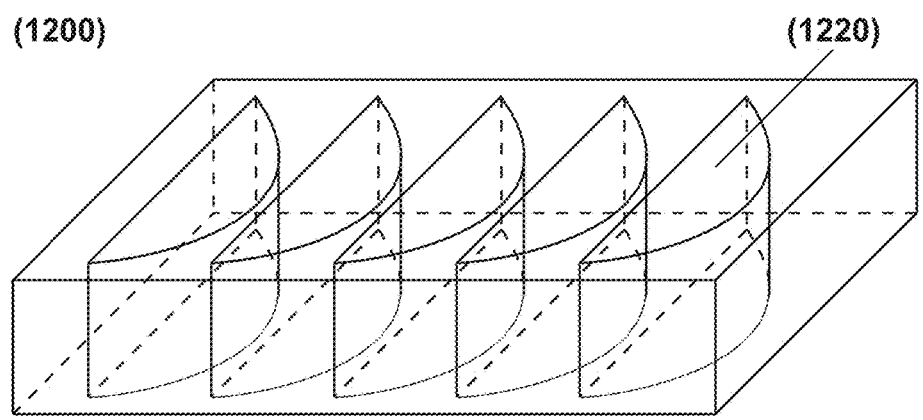
FIG. 12C. Prospective view on a stack of electro-optic lenses of FIG. 12B.
Figure 25:
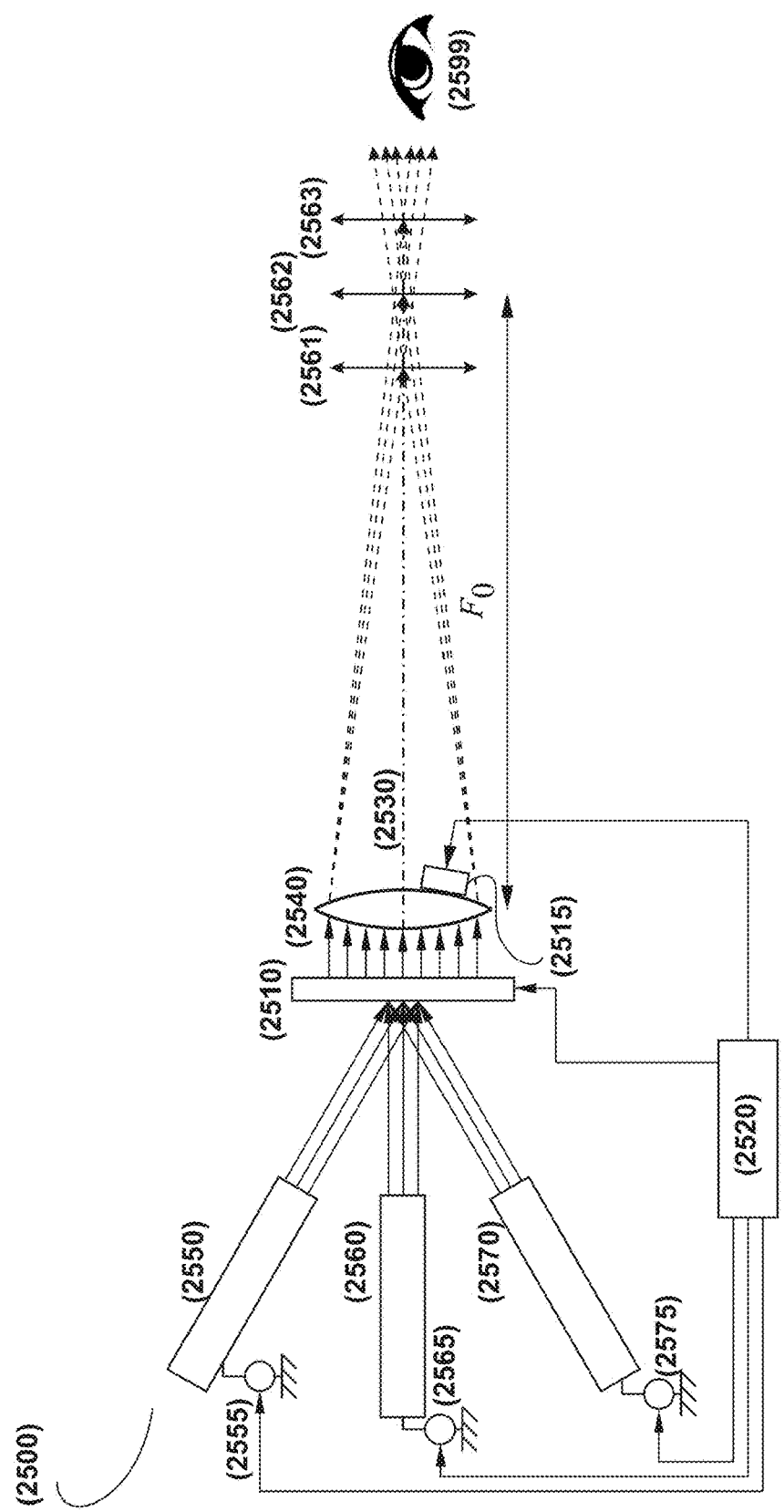
FIG. 25. An optical system, combining light emitted at multiple wavelengths in the red, green and blue spectral ranges into a single waveguide and controlling the focusing wavelength-sensitive optical element such that three-dimensional images formed in red, green and blue spectral range are formed at the same spatial location generating a full colored three-dimensional image, according to an embodiment of the present invention.

The optical system (2500) shown schematically in FIG. 25 suggests such a solution, according to a preferred embodiment of the present invention. Three multiwavelength laser sources (2550), (2560) and (2570) generate laser light in three basic color ranges, at multiple wavelengths for each basic color range. The control system (2520) controls a set of drivers (2555) for the laser source (2550), a set of drivers (2565) for the laser source (2560) and a set of drivers (2575) for the laser source (2570). All multiwavelength laser sources (2550), (2560) and (2570) and all sets of drivers (2555), (2565) and (2575) controlled by the control system (2520) result in the generation of pulses of laser light at multiple wavelengths in red, at multiple wavelengths in green and at multiple wavelengths in blue, pulses of laser light at different wavelengths non-overlapping in time. All generated laser light illuminates a transmissive two-dimensional display (2510) and transmitted light further impinges on a converging lens (2540), the focal length of which is wavelength-sensitive. The optical system (2500) includes applying a second means to adjust the focal length of the lens (2540). The control system (2520) generates a signal applied to a control element (2515), the latter being capable to adjust the focal length of the lens (2540). Thus, two means are applied to adjust the focal length of the lens (2540). The first means is switching between the lasers emitting at different wavelengths, whereas the focal length of the lens (2540) changes due to a dependence of the focal length on the wavelength. The second means may be any additional means not related to the change of the wavelength of laser light. Different realization of the second means are possible. The focal length of the lens (2540) can be adjusted by mechanical motion of the lens (2540), similarly to the optical system shown in FIG. 3. Alternatively, the focal length of the lens (2540) can be adjusted by a deformation of the lens, as it is employed in the optical system (500) or (1100) shown in FIGS. 5A, 5B and 11. As another alternative, an electric field can be applied to the lens and its focal length can be adjusted due to electro-optic effect as is illustrated in FIGS. 12A through 12C. In any of these approaches, the signal applied to the lens (2540) from the control element (2515) should be configured such that the change in the focal length of the lens (2540) due to its adjustment by the second means compensates the change in the focal length due to a switch between red, green and blue color range. Then, for each of the basic color ranges, red, green, and blue, the two dimensional images (2561), (2562) and (2563) will be formed at the same spatial location, i. e. the "mean position of the two-dimensional image" for each basic color range will be at the distance $F_0$ from the lens (2540) along the optical axis (2530). Thus, the human's eyes (2599) will perceive a fully colored three-dimensional image.

A one skilled in the art will appreciate that once a change in a focal length caused by a switch between two different basic color ranges is compensated by applying a second means to adjust the focal length of a lens, such compensation may be not exact, but rather an undercompensation or overcompensation. A natural criterion that two three-dimensional images formed in two different color ranges are perceived by the human's eyes as a single three-dimensional image requires that a distance between the mean position of a two-dimensional image in a first basic color range (a "center of gravity" of these images) and the mean position of a two-dimensional image in a second basic color range is preferably shorter than 50% of the maximum depth variation of the two dimensional images of each of these two color ranges. It is more preferably that the distance between the two mean positions is shorter than 20% of the maximum depth variation of the two-dimensional images in either of these basic color ranges.

Figure 26A:
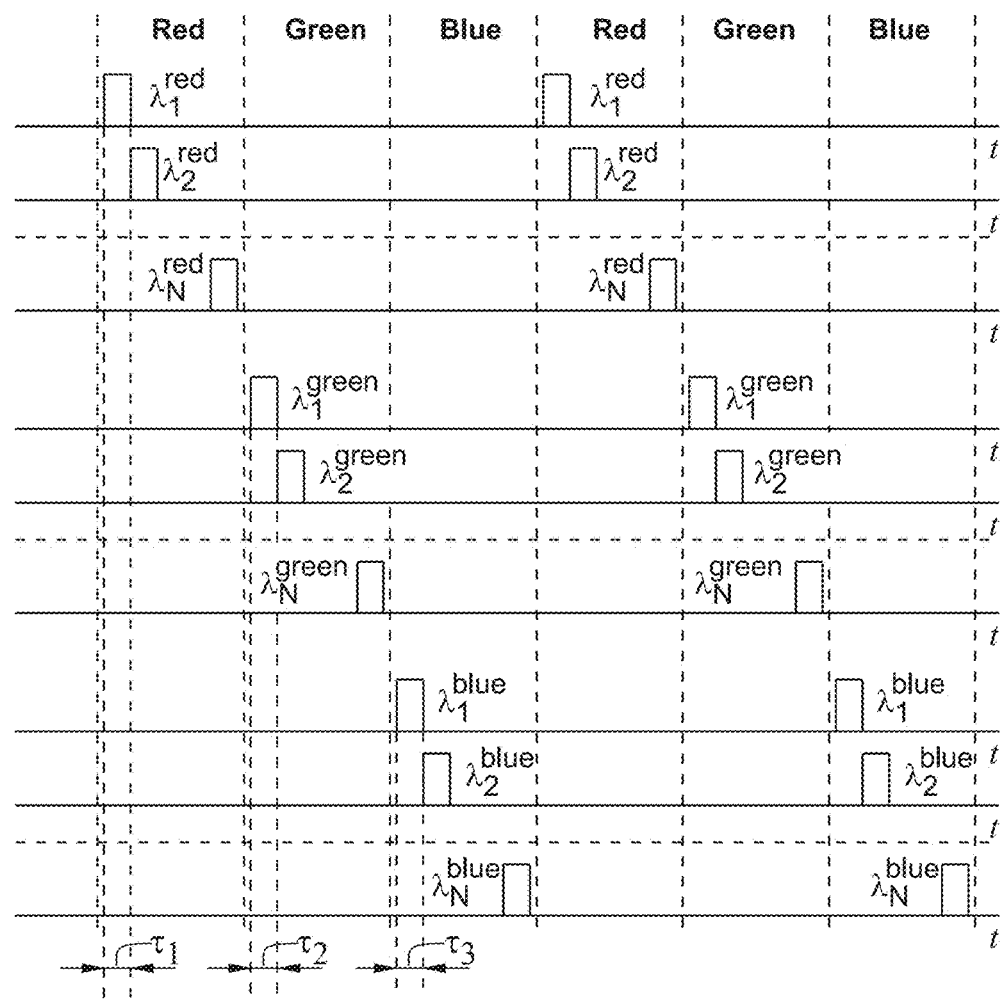
FIG. 26A. Temporal sequence of pulses of light at each wavelength, configured for the operation of the optical system of FIG. 25.
Figure 26B:
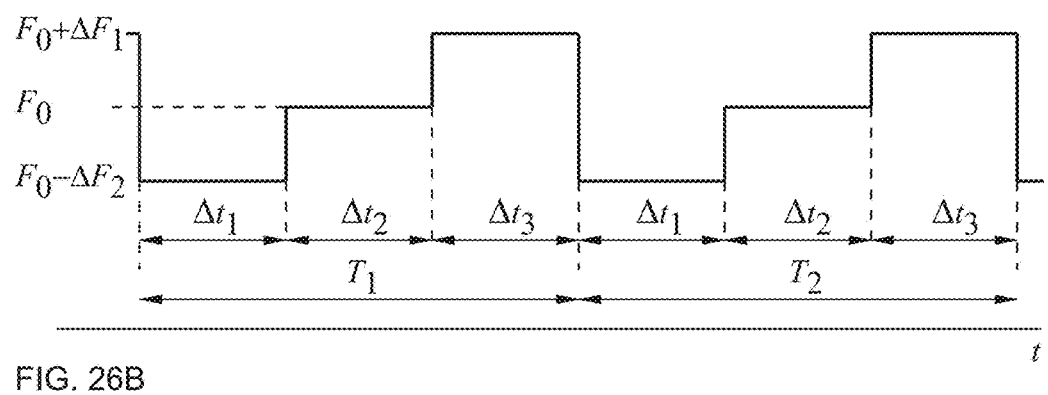
FIG. 26B. Temporal sequence of switching the focal length of the optical element of the optical system by a second mean of focal length control, aimed at focusing at the same location of the images generated in red, green and blue color ranges.

FIGS. 26A and 26B illustrate the synchronization of the signals applied to the lens (2540) from the control element (2515) with the sequence of the pulses of laser light. FIG. 26A illustrates the temporal sequence of the pulses of laser light at multiple wavelengths in the red spectral range, at multiple wavelengths in the green spectral range and at multiple wavelengths in the blue spectral range. Two duty cycles having the same duration $T_1=T_2=T$ are shown. During the first time interval $\Delta t_1$ during which red laser light is generated, the focal length corresponding to the "center of gravity" of the red light equals $F_0+\Delta F_2$, according to FIG. 14A. During the second time interval $\Delta t_2$ during which green laser light is generated, the focal length corresponding to the "center of gravity" of the green light equals $F_0$, according to FIG. 14B. FIG. 26B shows that, once the first time interval finishes and the second time interval starts, the control element (2515) adjusts the focal length of the lens by increasing its value by $\Delta F_2$, thus compensating the decrease of the focal length due to the change of the spectral range. During the third time interval $\Delta t_3$ during which blue laser light is generated, the focal length corresponding to the "center of gravity" of the blue light equals $F_0-\Delta F_1$, according to FIG. 14C. FIG. 26B shows that, once the second time interval finishes and the third time interval starts, the control element (2515) adjusts the focal length of the lens by increasing its value by $\Delta F_1$, thus compensating the decrease of the focal length due to the change of the spectral range. At the time moment, when a new duty cycle begins, the control element (2515) adjusts the focal length of the lens (2540) by decreasing its value by the value $(\Delta F_1+\Delta F_2)$ thus compensating an increase in the focal length due to shift from blue to red, according to FIGS. 14C and 14A. Once the optical system (2500) operates according to FIGS. 26A and 26B, the focal length corresponding to the mean wavelength (or to the "center of gravity") of the red spectrum of the laser light, to the mean wavelength of the green spectrum of the laser light and to the mean wavelength of the blue spectrum of the laser light, has the same value $F_0$.

Figure 27A:
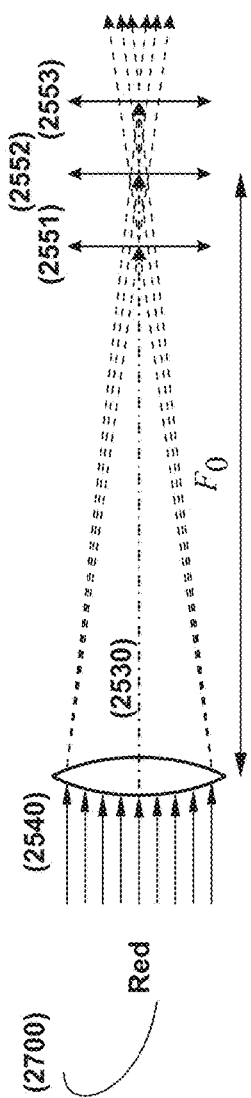
FIG. 27A. Schematics of the formation of a three-dimensional image in red spectral color range, by the optical system of FIG. 25.
Figure 27B:
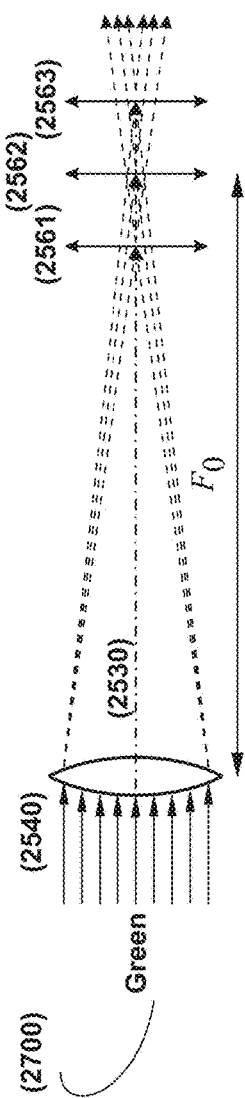
FIG. 27B. Schematics of the formation of a three-dimensional image in green spectral color range, by the optical system of FIG. 25.
Figure 27C:
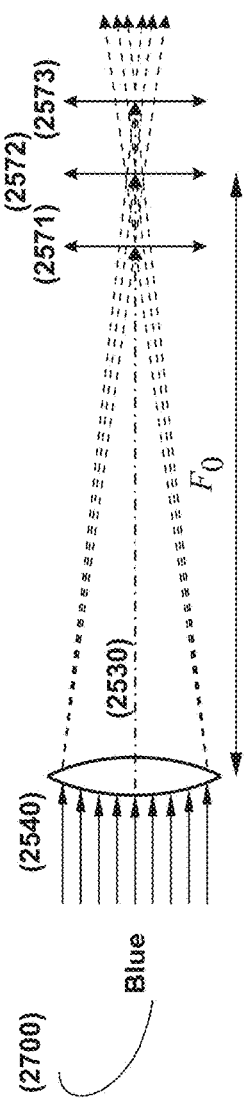
FIG. 27C. Schematics of the formation of a three-dimensional image in blue spectral color range, by the optical system of FIG. 25.
Figure 27D:
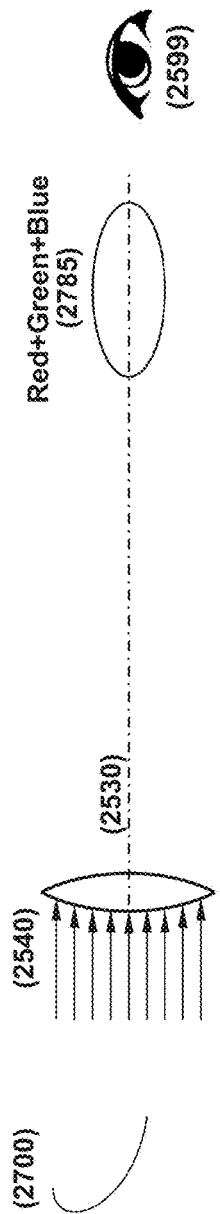
FIG. 27D. Schematic illustration of the formation at the same location of three-dimensional images in the red, green and blue spectral color range, as a result of the operation of the optical system of FIG. 25.

FIGS. 27A through 27D illustrate the formation of the image, which is perceived by the human's eyes as a colored three-dimensional image, by the optical system (2500). FIGS. 27A through 27D illustrate an element (2700) of the optical system (2500), wherein this element contains the lens (2540) and the images formed by the lens. FIG. 27A shows two-dimensional images formed by the red light at multiple wavelengths, and the "center of gravity" of the images is located at a distance $F_0$ from the lens (2540). Similarly, FIG. 27B shows two-dimensional images formed by the green light at multiple wavelengths, and the "center of gravity" of the images is located at the same distance $F_0$ from the lens (2540). Further, FIG. 27C shows two-dimensional images formed by the blue light at multiple wavelengths, and the "center of gravity" of the images is located at the same distance $F_0$ from the lens (2540). FIG. 27D shows that the human's eyes (2799), perceiving images at different depths as a three-dimensional image, will perceive a full colored three-dimensional image (2785) combining red, green and blue colors.

Combining FIGS. 25, 26A, 26B and 27A through 27D, one may comment the mode of operation of the optical system (2500) as follows. Let, for definiteness, the wavelengths of the laser light illuminating the two-dimensional display (2510) during the duty cycle change in a decreasing sequence, i.e.

$$\lambda_1^{red} > \lambda_2^{red} > \ldots > \lambda_N^{red} > \lambda_1^{green} >$$
$$\lambda_2^{green} > \ldots > \lambda_N^{green} > \lambda_1^{blue} >$$
$$\lambda_2^{blue} > \ldots > \lambda_N^{blue}. \quad (12)$$

and let the wavelength-sensitive focal length of the lens (2540) be an increasing function of the wavelength, such that the longest wavelength corresponds to the maximum focal length. Then, during the time interval $\tau_1$ of FIG. 26A the display (2510) is illuminated by the red laser light having the maximum wavelength $\lambda_1^{red}$. Then the control system (2520) sends to the drivers (2575) controlling the blue lasers such signals that all blue lasers are switched off. Similarly, the drivers (2565) controlling the green lasers receive such signals that all green lasers are switched off. One of the drivers (2555) controlling the red lasers receive a signal to switch one red laser on, which emits laser light with the wavelength $\lambda_1^{red}$, while all other red laser are switched off. The control element (2515) receives a signal from the control system (2520) such that the control element (2515) adjusts the focal length of the lens (2540) by reducing its value by $\Delta F_2$ as shown in FIG. 26B, by means of motion, deformation or applying electro-optic effect in an external electric field. Then the image of the display (2510) formed at the most remote position is formed at the position (2553) as shown in FIG. 27A.

Similarly, during the time interval $\tau_2$ of FIG. 26A the control system (2520) sends the signals to the sets of the drivers (2555), (2565) and (2575) such that only one green laser emits green laser light, i. e. the laser emitting light at the wavelength $\lambda_1^{green}$, the longest among all green wavelengths. At the same time the control system (2520) sends the signal to the control element (2515) such that the control element (2515) does not impose any adjustment of the focal length of the lens (2540) keeping its focal length corresponding to the "mean wavelength of the green wavelengths" equal $F_0$, as shown in FIG. 26B. Then the two-dimensional display (2510), once illuminated by the laser light at the wavelength $\lambda_1^{green}$ forms an image (2563) at the most remote position from the lens (2540), whereas this position is the same as the position (2553) of the image formed by red light.

Further, during the time interval $\tau_3$ of FIG. 26A the control system (2520) sends the signals to the sets of the drivers (2555), (2565) and (2575) such that only one blue laser emits blue laser light, that is the laser emitting light at the wavelength $\lambda_1^{blue}$, the longest among all blue wavelengths. At the same time the control system (2520) sends the signal to the control element (2515) such signal that the control element (2515) adjusts the focal length of the lens (2540) by increasing its value by $\Delta F_1$ as shown in FIG. 26B, by means of motion, deformation or applying electro-optic effect in an external electric field. Then the image of the display (2510) formed at the most remote position is formed at the position (2573) as shown in FIG. 27C, whereas this position is the same as the positions (2553) and (2563) formed in red and green light.

Thus, red, green and blue images are formed at the position (2553), which is the same as (2563) and (2573), according to FIGS. 27A through 27C. These images must be generated such that combined image is a part of the targeted three-dimensional image. Then, considering the targeted three-dimensional fully colored image and, in particular, considering the fully colored two-dimensional image needed to be created at the position (2553), it is possible to decompose this two-dimensional fully colored image into a superposition of three constituents, i.e. of a red, a green and a blue images. These constituent images should be sent by the control system (2520) to the two-dimensional display (2510) at the time intervals $\tau_1$, $\tau_2$ and $\tau_3$, respectfully.

Thus, the described way of synchronization of the signals sent by the control system (2520) to the set of the drivers (2555) controlling the red lasers, to the set of the drivers (2655) controlling the green lasers, to the set of the drivers (2575) controlling the blue lasers, to the control element (2515), capable to adjust the focal length of the lens (2540), and to the two-dimensional display (2510), results in the formation of a fully colored two-dimensional image at the position (2553). Same synchronization carried out at the other time intervals during the duty cycle results in the formation of the set of fully colored two-dimensional images located between the position (2551) (equal to the positions (2561) and (2571) in FIGS. 27A through 27C) and the position (2553) (equal to the positions (2563) and (2573) in FIGS. 27A through 27C). Then, once the duty cycle is shorter than the resolution time of the human's eyes, the human's eyes (2599) perceive all these images as a fully colored three-dimensional image.

A one skilled in the art will appreciate that a fully colored 3D image fused from red, green and blue images, is just an example of a colored image. Alternatively, an optical system can be built that fuses only two colors, e. g., red and blue, and the resulting image is also colored though with insufficient reproduction of colors as green is missing. Another alternative includes fusion of different three basic colors, e. g., red, yellow and blue, and the fully colored image also can be transmitted with a different color coding. Yet another alternative includes fusion of more than three basic colors, e. g., four colors: red, yellow, green and blue, to ensure an even better reproduction of a colored image.

Figure 28:
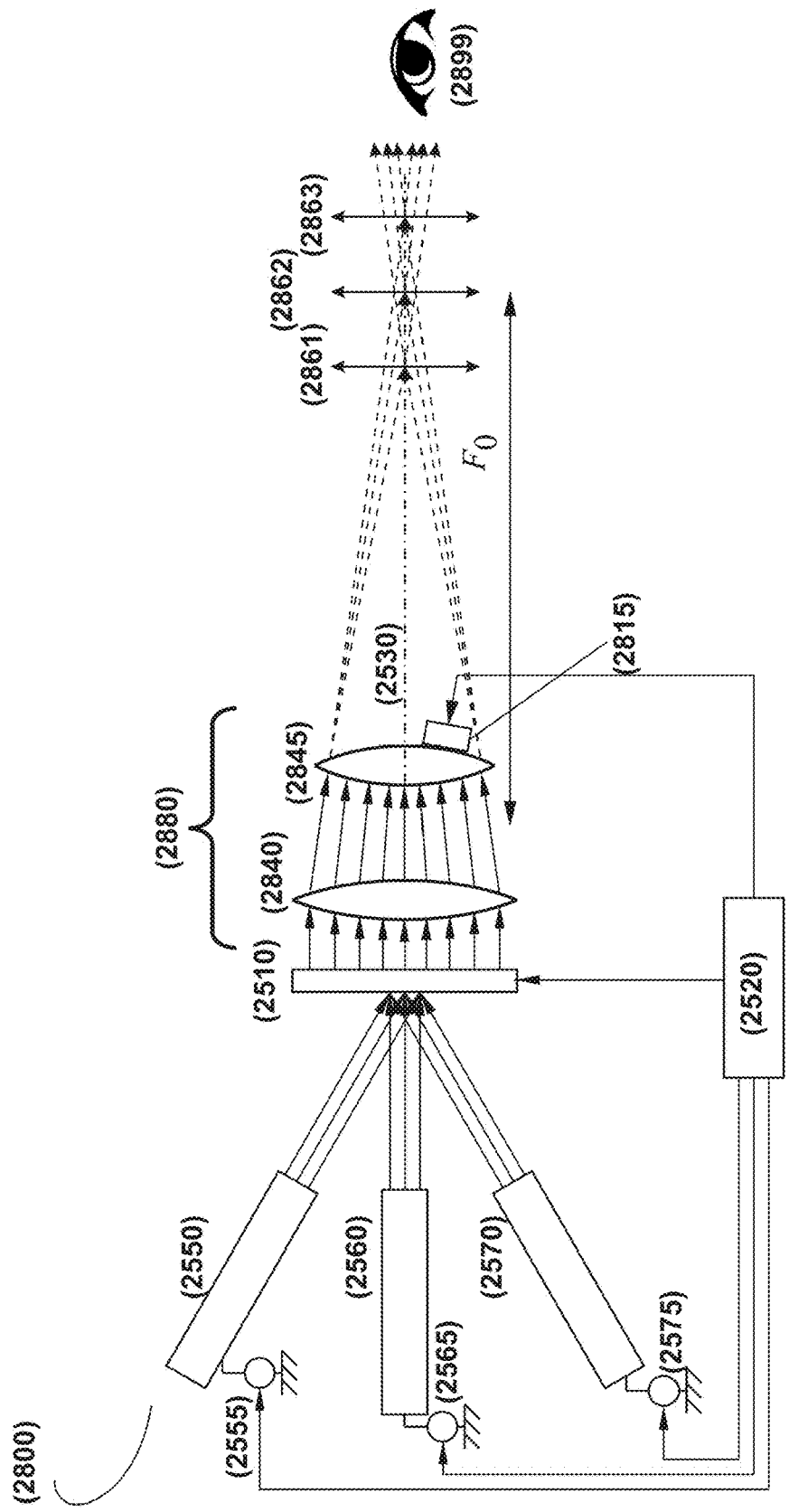
FIG. 28. An optical system, combining light emitted at multiple wavelengths in the red, green and blue spectral range into a single waveguide, and controlling an optical element with an adjustable focal length such that three-dimensional images formed in red, green and blue spectral range are formed at the same spatial location generating a full colored three-dimensional image, according to another embodiment of the present invention.

FIG. 28 illustrates schematically an optical system (2800) according to another embodiment of the present invention. Variation of the focal length due to changing wavelengths and adjustment of the focal length by a second means, e.g., by motion, deformation or applying electro-optic effect in an external electric field is now realized by two different lenses. Laser light from all laser sources transmitted through the transmissive two-dimensional display (2510) is further directed to the optical unit (2880). The optical unit (2880) consists of a converging lens (2840), the focal length of which is wavelength-sensitive, and a converging lens (2845), the focal length of which can be adjusted by a second means, e. g. by motion, by deformation, or by applying electro-optic effect in an external electric field. Thus the focusing of the laser light impinging on the optical unit (2880) is controlled by the focal length of the optical unit (2880) as a whole. The signal generated by the control system (2520) and applied via the control element (2815) to the lens (2845) compensates a change of the focal length of the optical unit (2880) caused by a switch between red, green and blue color ranges, and the human's eyes (2899) perceive a fully colored three-dimensional image.

Figure 29:
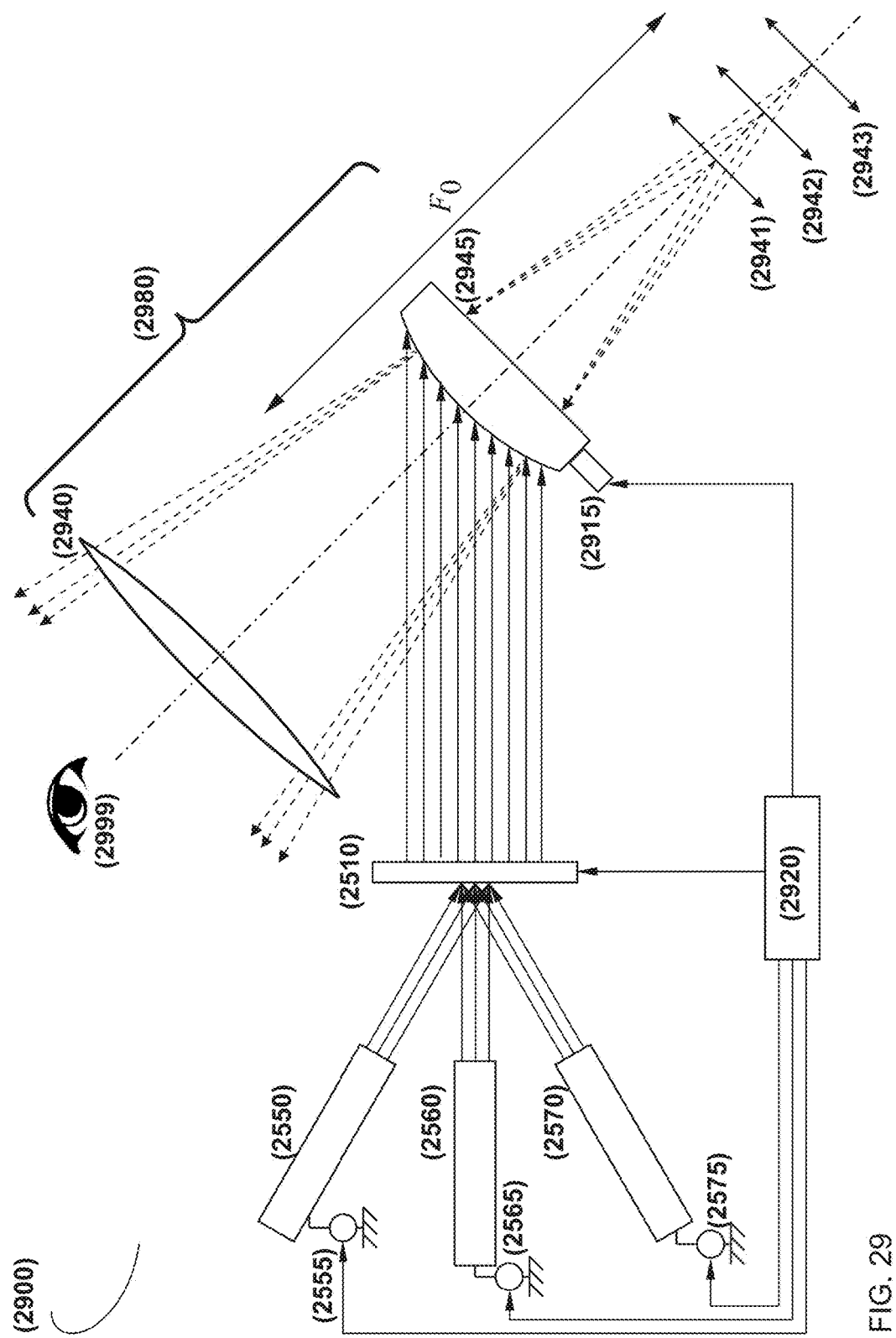
FIG. 29. An optical system, combining light emitted at multiple wavelengths in the red, green and blue spectral range into a single waveguide, and controlling an optical element with an adjustable focal length such that three-dimensional images formed in red, green and blue spectral range are formed at the same spatial location generating a full colored three-dimensional image, according to yet another embodiment of the present invention.

FIG. 29 shows schematically an optical system (2900) according to yet another embodiment of the present invention. An optical unit (2980) consists of a converging lens (2940) and a curved diverging mirror (2945). The converging lens (2940) has a wavelength-sensitive focal length. The focal length of the curved diverging mirror (2945) can be adjusted upon a signal generated by a control element (2915), by means of motion, deformation or applying electro-optic effect in an external electric field. Thus, the focal length of the optical unit (2980) as a whole can be varied by two means. Then the control system (2920) is capable to generate signals applied to the drivers (2555) of the red lasers, to the drivers (2565) of the green lasers, to the drivers (2575) of the blue lasers, to the control element (2915) controlling the adjustable focal length of the curved diverging mirror (2945) and to the two-dimensional display (2510), all synchronized in a similar way as it is done for the optical system of FIGS. 25, 26A, 26B and 27A through 27D. A change of the focal length of the optical unit (2980) by a switch between red, green and blue is compensated by adjustment provided by the control element (2915). This results in the formation of a set of virtual images (2941), (2942), (2943) of the two-dimensional displays. The position of the virtual image depends on the wavelength of the laser light illuminating the two-dimensional display (2510), and the "mean position" (2942) is the same for red, green and blue basic color range. In other words, the focal length F of the optical unit (2980) corresponding to the "mean wavelength" of the red wavelengths is the same for the "mean wavelength" of the green wavelengths and for the "mean wavelength" of the blue wavelengths. Further, for each basic color range, the virtual images are formed between positions (2941) and (2943). Upon a proper synchronization of the control signals generated by the control system (2920), the human's eyes (2999) perceive the set of two-dimensional virtual images (2941), (2942), (2943) as a fully colored three-dimensional image.

Figure 30:
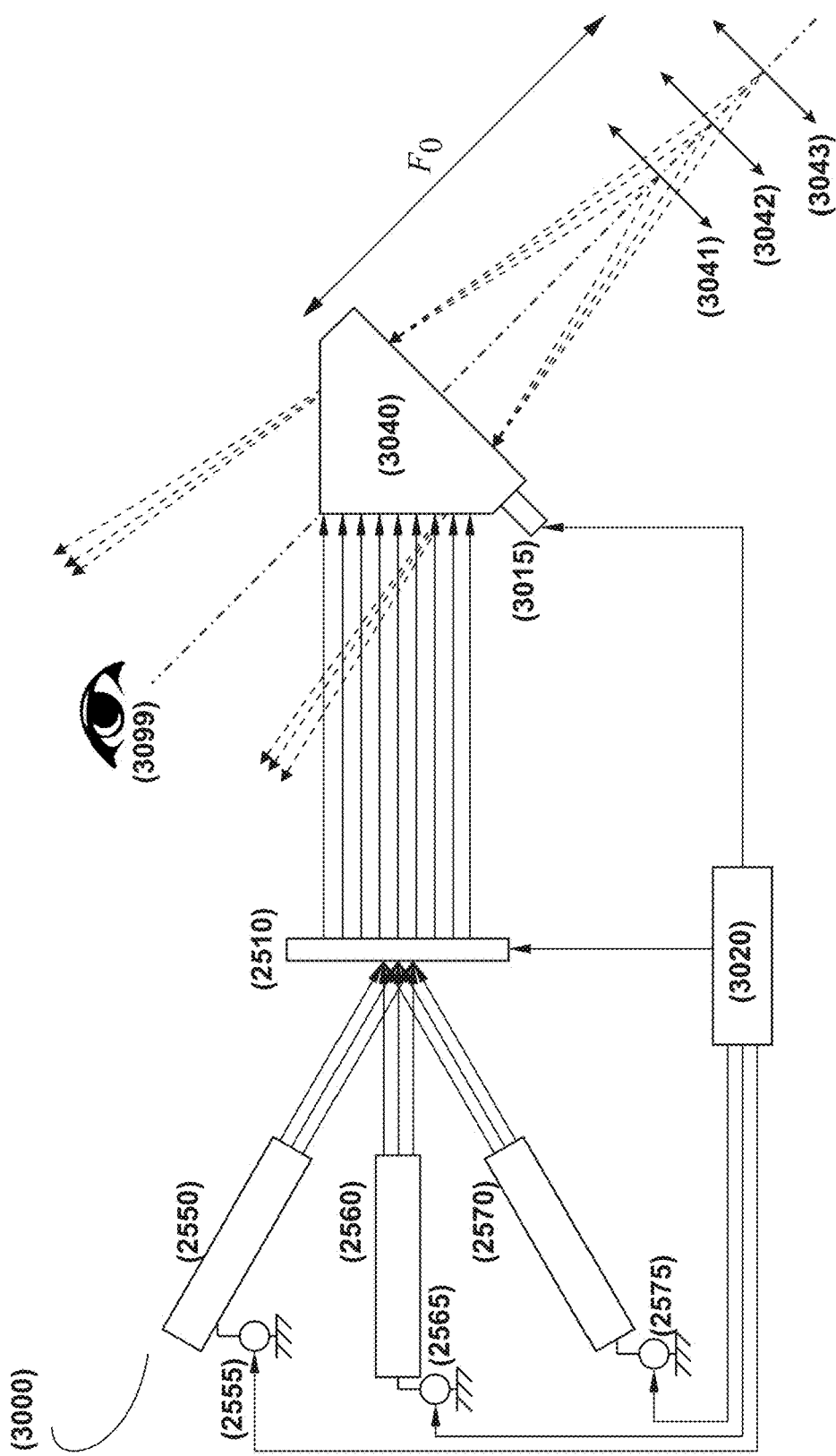
FIG. 30. An optical system, combining light emitted at multiple wavelengths in the red, green and blue spectral range into a single waveguide, and controlling the optical unit such that three-dimensional images formed in red, green and blue spectral range are formed at the same spatial location generating a full colored three-dimensional image, according to a further embodiment of the present invention.

FIG. 30 shows schematically an optical system (3000) according to a further embodiment of the present invention. The optical system (3000) contains an optical unit (3040) considered in a general form as a "black box", which can contain various optical elements like converging lens of FIG. 21A, diverging lens of FIG. 21B, converging curved mirror of FIG. 21C, diverging curved mirror of FIG. 21D, or any combination thereof, such that the focal length of the optical unit (3040) is, on the one hand, wavelength-sensitive and, on the other hand, can be additionally controlled and adjusted by another means, like motion, deformation, or applying electro-optic effect in an external electric field, via the control element (3015), to compensate a change of the focal length due to a switch between red, green and blue light. Then, by a proper synchronization of the signals generated by the control system (3020) and sent to the drivers (2555) of the red lasers, to the drivers (2565) of the green lasers, to the drivers (2575) of the blue lasers, to the control element (3015) and to the two-dimensional display (2510), a plurality of two dimensional virtual images (3041), (3042) and (3043) are created at the same positions for red, green and blue light, and the human's eyes (3099) perceive this plurality of two-dimensional virtual images as a fully colored three-dimensional image.

Figure 31:
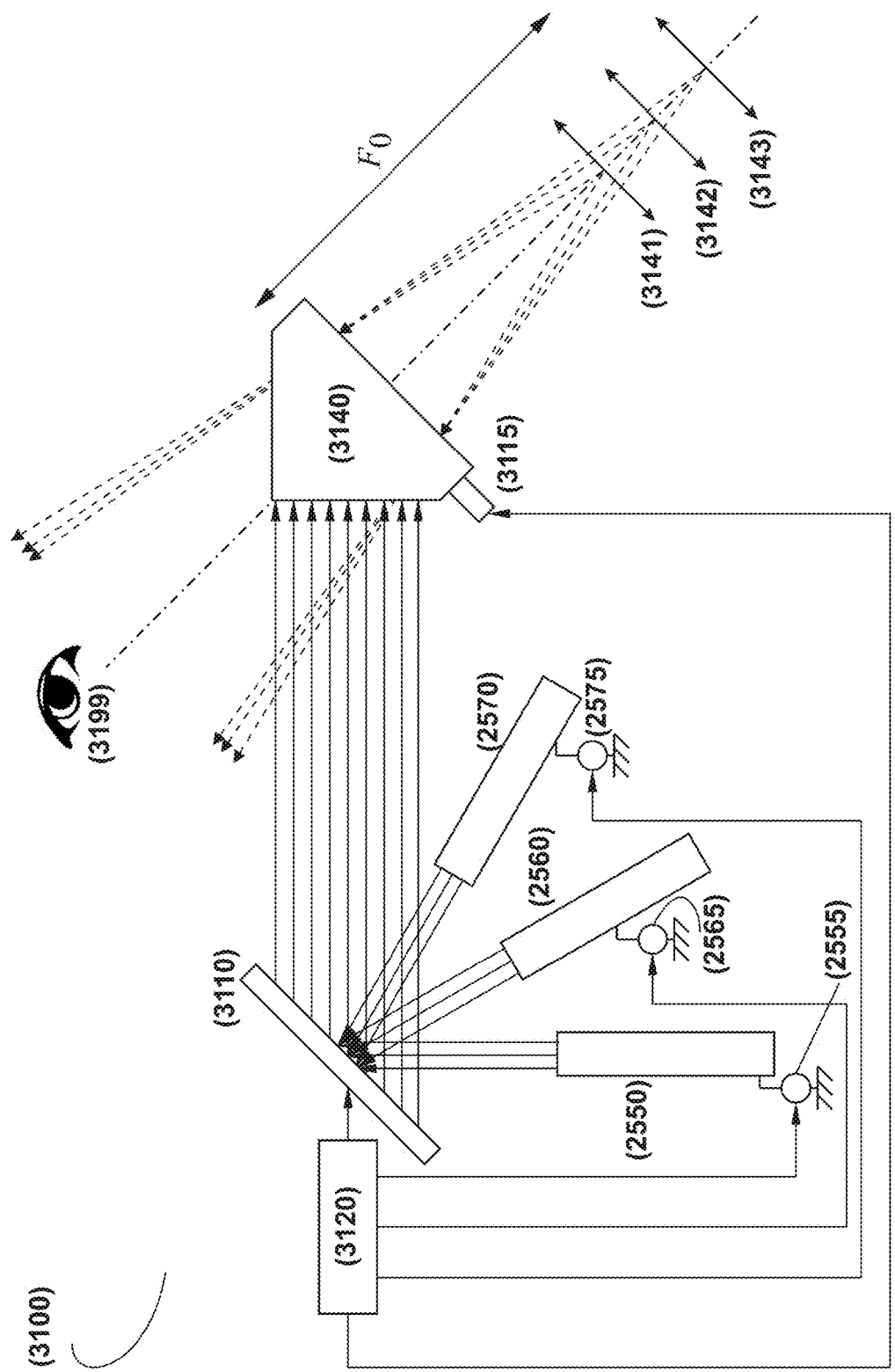
FIG. 31. An optical system, combining light emitted at multiple wavelengths in the red, green and blue spectral range into a single waveguide, and controlling the optical unit such that three-dimensional images formed in red, green and blue spectral range are formed at the same spatial location generating a full colored three-dimensional image, according to another embodiment of the present invention.

FIG. 31 shows schematically an optical system (3100) according to another embodiment of the present invention. It is different from the optical system (3000) as a reflective two-dimensional display (3110) is employed instead of a transmissive two-dimensional display (2510). The optical unit (3140) has, on the one hand, a wavelength-sensitive focal length and, on the other hand, this focal length, can be additionally controlled and adjusted via the control element (3115), by another means, like motion, deformation, or applying electro-optic effect in an external electric field to a lens or a mirror, such that a change of the focal length occurring by a switch between red, green and blue color range is compensated. Then, by a proper synchronization of the signals generated by the control system (3120) and sent to the drivers (2555) of the red lasers, to the drivers (2565) of the green lasers, to the drivers (2575) of the blue lasers, to the control element (3115) and to the two-dimensional display (3110), a plurality of two dimensional virtual images (3141), (3142) and (3143) are created at the same positions for red, green and blue light, and the human's eyes (3199) perceive this plurality of two-dimensional virtual images as a fully colored three-dimensional image.

Figure 32:
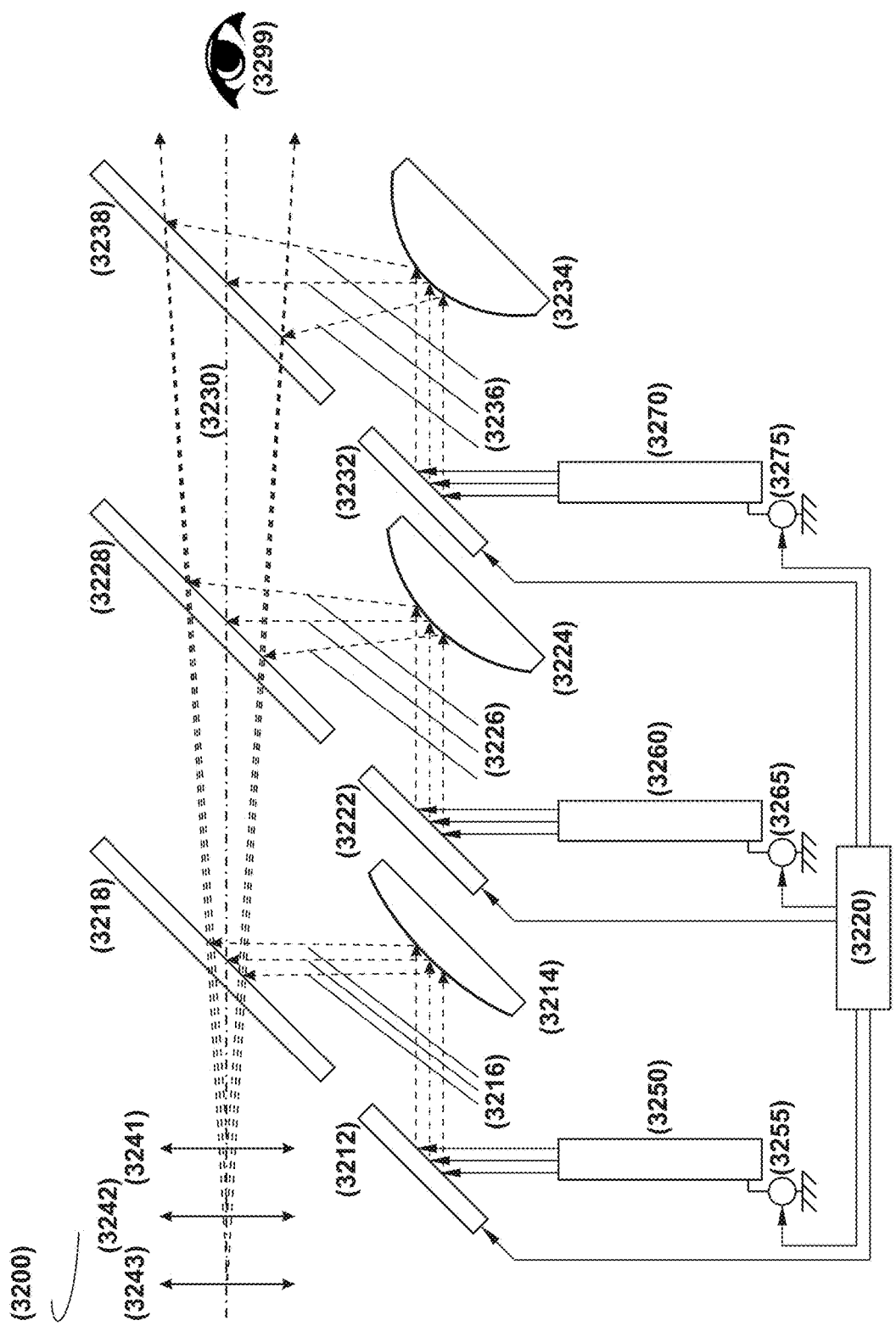
FIG. 32. An optical system, according to a further embodiment of the present invention, wherein separate two-dimensional displays and separated optical elements having wavelength-sensitive focal lengths are used for red, green and blue light, and forming three-dimensional images are fused into a single full colored three-dimensional image, according to yet another embodiment of the present invention.

FIG. 32 illustrates schematically an optical system (3200) according to yet another embodiment of the present invention. Optical units having wavelength-sensitive focal lengths are used, but no additional means to control the focal length due to motion, deformation or electro-optic effect in an external electric field are applied. Three-dimensional images are created independently for each basic color range and then fused as follows. The multiwavelength source (3250) of laser light in the red color range generates light at a plurality of the wavelengths, all lasers being independently controlled by the drivers (3255). The lasers (3250) illuminate the reflective two-dimensional display (3212). The light reflected from the reflective two-dimensional display (3212) impinges on a diverging curved mirror (3214). The focal length of the diverging curved mirror (3214) is wavelength-sensitive. The light (3216) reflected from the diverging curved mirror (3214) is further reflected from the flat mirror (3218) forming virtual images (3241), (3242), (3243) behind the flat mirror (3218). The light reflected from the flat mirror (3218) is further transmitted through a semitransparent flat mirror (3228) and a semitransparent mirror (3238), both being transparent for red light.

The multiwavelength source (3260) of laser light in the green color range generates light at a plurality of wavelengths, all lasers being independently controlled by the drivers (3265). The lasers (3260) illuminate the reflective two-dimensional display (3222). The light reflected from the reflective two-dimensional display (3222) impinges on a diverging curved mirror (3224). The focal length of the diverging curved mirror (3224) is wavelength-sensitive. The light (3226) reflected from the diverging curved mirror (3224) is further reflected from the flat mirror (3228) forming virtual images behind the flat mirror (3228) and behind the flat mirror (3218). The curvature of the diverging curved mirror (3224) is preferably larger than the curvature of the diverging curved mirror (3214), therefore the divergence angle of the light beam (3226) is larger than the divergence angle of the light beam (3216). The divergence angle of the light beam (3226) is configured such that, upon reflection from the flat mirror (3228) the virtual images in the green light are formed at the same location (3241), (3242), (3243) as the virtual images in the red light. Green light is further transmitted through the semitransparent mirror (3238), the mirror (3238) being transparent for green light.

The multiwavelength source (3270) of laser light in the blue color range generates light at a plurality of wavelengths, all lasers being independently controlled by the drivers (3275). The lasers (3270) illuminate the reflective two-dimensional display (3232). The light reflected from the reflective two-dimensional display (3232) impinges on a diverging curved mirror (3234). The focal length of the diverging curved mirror (3234) is wavelength-sensitive. The light (3236) reflected from the diverging curved mirror (3234) is further reflected from the flat mirror (3238) forming virtual images behind the flat mirrors (3238), (3228), (3218). The curvature of the diverging curved mirror (3234) is preferably larger than the curvature of the diverging curved mirror (3224), therefore the divergence angle of the light beam (3236) is larger than the divergence angle of the light beam (3226). The divergence angle of the light beam (3236) is configured such that, upon reflection from the flat mirror (3238) the virtual images in the blue light are formed at the same location (3241), (3242), (3243) as the virtual images in the red and in the green light.

A possible way to configure the flat mirrors (3218), (3228) and (3238) can be chosen as but is not limited to the following one. All three flat mirrors (3218), (3228) and (3238) can be configured as distributed Bragg reflectors. The spectral position of the reflectivity stopbands can be chosen such that the mirror (3218) is reflecting to the red light, the mirror (3228) is transparent to the red light, but reflecting to the green light, and the mirror (3238) is transparent to the red and green light, but reflecting to the blue light.

Control signals generated by the control system (3220) and sent to the laser drivers (3255), to the display (3212), to the laser drivers (3265), to the display (3222), to the laser drivers (3275), to the display (3232) are configured such that the human's eyes (3299) perceive a fully colored three-dimensional image.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above but to include all possible embodiments which can be embodied within a scope encompassed and equivalents thereof with respect to the features set out in the appended claims.

What is claimed is:

1. An optical system comprising
  a) a first multiple wavelength laser source capable to emit laser light at a first plurality of wavelengths in a first basic color range,
  b) at least one second multiple wavelength laser source capable to emit laser light at a second plurality of wavelengths in a second basic color range, wherein said second basic color range is distinct from said first basic color range,
c) at least one two-dimensional display illuminated by
   i) laser light at a first wavelength from said first plurality of wavelengths and
   ii) laser light at at least one second wavelength from said first plurality of wavelengths,
      wherein said at least one second wavelength from said first plurality of wavelengths is distinct from said first wavelength from said first plurality of wavelengths,
   iii) laser light at a first wavelength from said second plurality of wavelengths and
   iv) laser light at at least one second wavelength from said second plurality of wavelengths,
      wherein said second wavelength from said second plurality of wavelengths is distinct from said first wavelength from said second plurality of wavelengths,
d) at least one optical unit,
   wherein said at least one optical unit further comprises
   A) a first optical element, having a focal length,
      wherein said focal length of said first optical element is different for different wavelengths, and
   B) at least one second optical element having an adjustable focal length,
   wherein said adjustable focal length can be adjusted by a means selected from the group of means consisting of:
      i) applying relative motion of said at least one second optical element and said at least one two-dimensional display,
      ii) applying deformation to said at least one second optical element,
      iii) applying electro-optic effect in an external electric field to said at least one second optical element,
      iv) any combination of i) through iii),
   wherein said at least one optical unit creates a first plurality of two-dimensional images of said at least one two-dimensional display formed by light at said first plurality of wavelengths,
   wherein said first plurality of two-dimensional images has a first mean position,
   wherein said first plurality of two-dimensional images has a first spreading of positions,
   wherein said at least one optical unit creates a second plurality of two-dimensional images of said at least one two-dimensional display formed by light at said second plurality of wavelengths,
   wherein said second plurality of two-dimensional images has a second mean position,
   wherein said second plurality of two-dimensional images has a second spreading of positions,
e) a control system,
   wherein said control systems synchronizes
      AA) a state of said at least one two-dimensional display,
      BB) pulses of laser light of said first multiple wavelength laser source,
      CC) pulses of laser light of said second multiple wavelength laser source, and
      DD) a signal set to adjust said adjustable focal length of said at least one second optical element,
   such that the human's eyes perceive said first plurality of two-dimensional images of said at least one two-dimensional display as a three-dimensional image in said first basic color range,
   such that the human's eyes perceive said second plurality of two-dimensional images of said at least one two-dimensional display as a three-dimensional image in said second basic color range,
   such that said adjustable focal length of said at least one second optical element is adjusted such as said adjustment compensates a change of said optical length of said first optical element due to switch of light between said first basic color range and said second basic color range,
   wherein said compensation results in fusion of said three-dimensional image in said first basic color range and said three-dimensional image in said second basic color range,
   wherein said fusion means that said three-dimensional image in said first basic color range and said three-dimensional image in said second basic color range overlap in space,
   wherein said overlapping in space means than
      a distance between said second mean position and said first mean position is
         AAA) smaller than fifty percent of said first spreading of positions and
         BBB) smaller than fifty percent of said second spreading of positions,
   wherein the human's eyes perceive said first plurality of two-dimensional images of said at least one two-dimensional display and said second plurality of two-dimensional images of said at least one two-dimensional display as a single fully colored three-dimensional image.

2. The optical system of claim 1,
wherein said at least one second optical element having an adjustable focal length is distinct from said first optical element.

3. The optical system of claim 1,
wherein said at least one second optical element having an adjustable focal length is the same as said first optical element having a wavelength-dependent focal length.

4. The optical system of claim 1,
wherein said first basic color range and said second basic color range are selected from the group consisting of:
a) red color spectrum,
b) yellow color spectrum,
c) green color spectrum, and
d) blue color spectrum.

5. The optical system of claim 1,
wherein said at least one two-dimensional display is selected from the group consisting of
a) a transmissive two-dimensional display, and
b) a reflective two-dimensional display.

6. The optical system of claim 1,
wherein said at least one two-dimensional display is selected from the group consisting of
a) a liquid crystal display, and
b) a display based on a micro-electro-mechanical system (MEMS).

7. The optical system of claim 1,
wherein at least one two-dimensional image of said first plurality of two-dimensional images of said at least one two-dimensional display is selected from the group consisting of:
a) a real two-dimensional image, and
b) a virtual two-dimensional image.

8. The optical system of claim 1,
wherein said first multiple wavelength laser source is formed on a single semiconductor chip.

9. The optical system of claim 8,
wherein said first multiple wavelength laser source is selected from the group consisting of
a) an array of distributed feedback lasers,
   wherein different lasers of said array of distributed feedback lasers emit laser light at different wavelengths,
b) an array of distributed Bragg reflector lasers,
   wherein different lasers of said array of distributed Bragg reflector lasers emit laser light at different wavelengths, and
c) a COMB laser emitting laser light at multiple wavelengths.

10. The optical system of claim 9,
wherein said first multiple wavelength laser source is a COMB laser,
wherein said optical system further comprises
f) a splitter capable to split laser light emitted at said first wavelength from said first plurality of wavelengths and laser light emitted at said second wavelength from said first plurality of wavelengths,
wherein laser light at said first wavelength from said first plurality of wavelengths is directed along a first channel, and
wherein laser light at said second wavelength from said first plurality of wavelengths is directed along a second channel, distinct from said first channel,
wherein at least one of said first channel and said second channel further contains
g) a delay line,
wherein said first two-dimensional display is illuminated by pulses of laser light at said first wavelength from said first plurality of wavelengths and pulses of laser light at said second wavelength from said second plurality of wavelengths, such that said pluses of laser light at said first wavelength from said first plurality of wavelengths do not overlap in time with pulses of laser light at said second wavelength from said first plurality of wavelengths.

11. The optical system of claim 1,
wherein said at least one optical element is selected from the group consisting of
i) a converging lens,
ii) a diverging lens,
iii) a curved converging mirror, and
iv) a curved diverging mirror.

12. The optical system of claim 1, further comprising
at least one third multiple wavelength laser source capable to emit laser light at a third plurality of wavelengths in a third basic color range,
wherein said third basic color range is distinct from said first basic color range and from said second basic color range,
wherein said at least one two-dimensional display is further illuminated by
v) laser light at a first wavelength from said third plurality of wavelengths and
vi) laser light at at least one second wavelength from said third plurality of wavelengths,
   wherein said second wavelength of said third plurality of wavelengths is distinct from said first wavelength of said third plurality of wavelengths,
wherein said at least one optical unit creates a third plurality of two-dimensional images of said at least one two-dimensional display formed by light at said third plurality of wavelengths,
wherein said third plurality of two-dimensional images has a third mean position,
wherein said third plurality of two-dimensional images has a third spreading of positions,
wherein said control systems further synchronizes
a state of said at least one two-dimensional display, and
pulses of laser light of said at least one third multiple wavelength laser source
such that the human's eyes perceive said third plurality of two-dimensional images of said at least one two-dimensional display as a three-dimensional image in said third basic color range,
wherein a means is applied for fusion of said third plurality of two-dimensional images of said at least one two-dimensional display with said first plurality of two-dimensional images of said at least one two-dimensional display and with said second plurality of two-dimensional images of said at least one two-dimensional display,
wherein as a result of said fusion said three-dimensional image in said first basic color range and said three-dimensional image in said second basic color range and said three-dimensional image in said third basic color range overlap in space,
wherein the human's eyes perceive said first plurality of two-dimensional images of said at least one two-dimensional display, said second plurality of two-dimensional images of said at least one two-dimensional display and said third plurality of two-dimensional images of said at least one two-dimensional display as a single fully colored three-dimensional image formed by light in three said basic color ranges.

* * * * *